US012143760B2

(12) United States Patent
Roh et al.

(10) Patent No.: US 12,143,760 B2
(45) Date of Patent: Nov. 12, 2024

(54) SOUND APPARATUS AND APPARATUS INCLUDING THE SAME

(71) Applicant: LG Display Co., Ltd., Seoul (KR)

(72) Inventors: Eun Roh, Paju-si (KR); NohJin Myung, Paju-si (KR); Seungkyu Lee, Paju-si (KR); SangHoon Oh, Paju-si (KR); Jieun Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 314 days.

(21) Appl. No.: 17/941,927

(22) Filed: Sep. 9, 2022

(65) Prior Publication Data

US 2023/0209233 A1 Jun. 29, 2023

(30) Foreign Application Priority Data

Dec. 28, 2021 (KR) ........................ 10-2021-0189969

(51) Int. Cl.
*H04R 1/24* (2006.01)
*H04R 1/02* (2006.01)
*H04R 17/00* (2006.01)

(52) U.S. Cl.
CPC ............. *H04R 1/028* (2013.01); *H04R 17/00* (2013.01); *H04R 2499/15* (2013.01)

(58) Field of Classification Search
CPC ......... H04R 1/24; H04R 17/00; H04R 17/005; H04R 23/02; H04R 2499/11; H04R 2499/15
See application file for complete search history.

(56) References Cited

U.S. PATENT DOCUMENTS 2,593,031 A * 4/1952 Howatt .................... H04R 1/24 381/116
4,401,857 A * 8/1983 Morikawa ................ H04R 1/26 310/320
4,475,014 A * 10/1984 King ...................... H04R 23/02 381/186
5,193,119 A * 3/1993 Tontini ..................... H04R 1/24 381/190
5,295,194 A * 3/1994 Christensen ........... H04R 17/00 381/396
6,347,149 B1 * 2/2002 Bachmann ............. H04R 9/045 381/396

(Continued)

FOREIGN PATENT DOCUMENTS

EP 3016405 A1 * 5/2016 ............... H04R 1/10
GB 438824 A * 10/1934

(Continued)

*Primary Examiner* — Ryan Robinson
(74) *Attorney, Agent, or Firm* — Morgan, Lewis & Bockius LLP

(57) ABSTRACT

A sound apparatus includes a first vibration member, a second vibration member adjacent to the first vibration member, a third vibration member adjacent to the second vibration member, a first vibration apparatus configured to vibrate the first vibration member and the second vibration member and output a sound of a first pitched sound band and a sound of a second pitched sound band which differ, and a second vibration apparatus disposed at a rear surface of the third vibration member and configured to vibrate the third vibration member and output a sound of a third pitched sound band which differs from the sound of the first pitched sound band.

35 Claims, 8 Drawing Sheets

(56) References Cited

U.S. PATENT DOCUMENTS

| | | | | |
|---|---|---|---|---|
| 8,907,733 | B2 * | 12/2014 | Onishi | H04R 17/00 310/349 |
| 10,313,801 | B2 * | 6/2019 | Park | H04R 1/025 |
| 10,433,073 | B2 * | 10/2019 | Ishii | H04R 7/12 |
| 10,638,235 | B2 * | 4/2020 | Chen | B81B 7/02 |
| 11,418,891 | B2 * | 8/2022 | Rusconi Clerici Beltrami | H04R 1/24 |
| 2017/0026758 | A1 * | 1/2017 | Wen | H04R 1/24 |
| 2018/0124499 | A1 * | 5/2018 | Li | H04R 9/02 |
| 2018/0167719 | A1 * | 6/2018 | Hosaka | H04R 1/24 |
| 2018/0332406 | A1 * | 11/2018 | Park | H04R 23/02 |
| 2019/0334076 | A1 * | 10/2019 | Kim | B06B 1/045 |
| 2023/0069090 | A1 * | 3/2023 | Kudekar | H04R 17/00 |
| 2023/0179932 | A1 * | 6/2023 | Kocher | H04R 25/606 381/326 |
| 2024/0040318 | A1 * | 2/2024 | Xu | H04R 9/025 |

FOREIGN PATENT DOCUMENTS

| | | | | | |
|---|---|---|---|---|---|
| JP | 55091299 | A | * | 7/1980 | |
| JP | 56083200 | A | * | 7/1981 | |
| JP | 57099899 | A | * | 6/1982 | H04R 17/00 |
| JP | 60027300 | A | * | 2/1985 | H04R 1/24 |
| KR | 101755329 | B1 | * | 7/2017 | |
| KR | 101913157 | B1 | * | 11/2018 | |
| WO | WO-2016199875 | A1 | * | 12/2016 | H04R 1/02 |
| WO | WO-2020158173 | A1 | * | 8/2020 | |
| WO | WO-2021085981 | A1 | * | 5/2021 | H04R 1/26 |

* cited by examiner

SOUND APPARATUS AND APPARATUS INCLUDING THE SAME

CROSS-REFERENCE TO RELATED APPLICATIONS

This application claims the benefit of the Korean Patent Application No. 10-2021-0189969 filed on Dec. 28, 2021, which is hereby incorporated by reference as if fully set forth herein.

BACKGROUND

Technical Field

The present disclosure relates to a sound apparatus and an apparatus including the same.

Discussion of the Related Art

Apparatuses include a separate speaker or sound apparatus, for providing a sound. When a speaker is provided in an apparatus, a problem occurs where the design and space arrangement of the apparatus are limited due to a space occupied by the speaker.

A speaker applied to apparatuses may be, for example, an actuator including a magnet and a coil. However, when an actuator is applied to an apparatus, there is a drawback where a thickness is thick. Piezoelectric devices for implementing a thin thickness are attracting much attention.

Due to a fragile characteristic, piezoelectric devices are easily damaged due to an external impact, causing a problem where the reliability of sound reproduction is low.

SUMMARY

The inventors have recognized problems described above and have performed various experiments for implementing a sound apparatus which may output a sound of a broad pitched sound band and may enhance a sound pressure level characteristic. Through the various experiments, the inventors have invented an apparatus including a new sound apparatus which may output a sound of a broad pitched sound band and may enhance a sound pressure level characteristic.

Accordingly, embodiments of the present disclosure are directed to a sound apparatus and an apparatus including the same that substantially obviates one or more of the problems due to limitations and disadvantages of the related art.

An aspect of the present disclosure is to provide an apparatus which may vibrate a vibration member to generate a vibration or a sound and may enhance a sound characteristic and/or a sound pressure level characteristic.

Another aspect of the present disclosure is to provide an apparatus including one sound apparatus, which may vibrate a vibration member to generate a vibration or a sound and may output a sound of a broad pitched sound band.

Additional aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a sound apparatus comprises a first vibration member, a second vibration member adjacent to the first vibration member, a third vibration member adjacent to the second vibration member, a first vibration apparatus configured to vibrate the first vibration member and the second vibration member and output a sound of a first pitched sound band and a sound of a second pitched sound band which differ, and a second vibration apparatus disposed at a rear surface of the third vibration member and configured to vibrate the third vibration member and output a sound of a third pitched sound band which differs from the sound of the first pitched sound band.

In another aspect, an apparatus comprises a passive vibration member and a sound apparatus disposed at a rear surface of the passive vibration member. The passive vibration member includes a metal material or includes one or more single or complex nonmetal materials of wood, rubber, plastic, glass, fiber, cloth, paper, mirror, and leather. For example, the sound apparatus includes a first vibration member, a second vibration member adjacent to the first vibration member, a third vibration member adjacent to the second vibration member, a first vibration apparatus configured to vibrate the first vibration member and the second vibration member and output a sound of a first pitched sound band and a sound of a second pitched sound band which differ, and a second vibration apparatus disposed at a rear surface of the third vibration member and configured to vibrate the third vibration member and output a sound of a third pitched sound band which differs from the sound of the first pitched sound band.

In another aspect, an apparatus comprises a passive vibration member and a sound apparatus disposed at a rear surface of the passive vibration member. The passive vibration member includes one or more of a display panel including a pixel configured to display an image, a light emitting diode lighting panel, an organic light emitting diode lighting panel, and an inorganic light emitting diode lighting panel. For example, the sound apparatus includes a first vibration member, a second vibration member adjacent to the first vibration member, a third vibration member adjacent to the second vibration member, a first vibration apparatus configured to vibrate the first vibration member and the second vibration member and output a sound of a first pitched sound band and a sound of a second pitched sound band which differ, and a second vibration apparatus disposed at a rear surface of the third vibration member and configured to vibrate the third vibration member and output a sound of a third pitched sound band which differs from the sound of the first pitched sound band.

In another aspect, an apparatus comprises a passive vibration member and a sound apparatus disposed at a rear surface of the passive vibration member. The passive vibration member includes one or more of a display panel including a pixel configured to display an image, a screen panel on which an image is to be projected from a display apparatus, a lighting panel, a signage panel, a vehicular interior material, a vehicular glass window, a vehicular external material, a ceiling material of a building, an interior material of a building, a glass window of a building, an interior material of an aircraft, a glass window of an aircraft, metal, wood, rubber, plastic, glass, fiber, cloth, paper, leather, and mirror. For example, the sound apparatus includes a first vibration member, a second vibration member adjacent to the first vibration member, a third vibration member adjacent to the second vibration member, a first vibration apparatus configured to vibrate the first vibration member and the second vibration member and output a sound of a first pitched sound band and a sound of a second pitched sound band which differ, and a second vibration apparatus disposed at a rear surface of the third vibration member and configured to vibrate the third vibration member and output a sound of a third pitched sound band which differs from the sound of the first pitched sound band.

Other systems, methods, features and advantages will be, or will become, apparent to one with skill in the art upon examination of the following figures and detailed description. It is intended that all such additional systems, methods, features, and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate aspects and embodiments of the disclosure and together with the description serve to explain principles of the disclosure.

Figure 1:
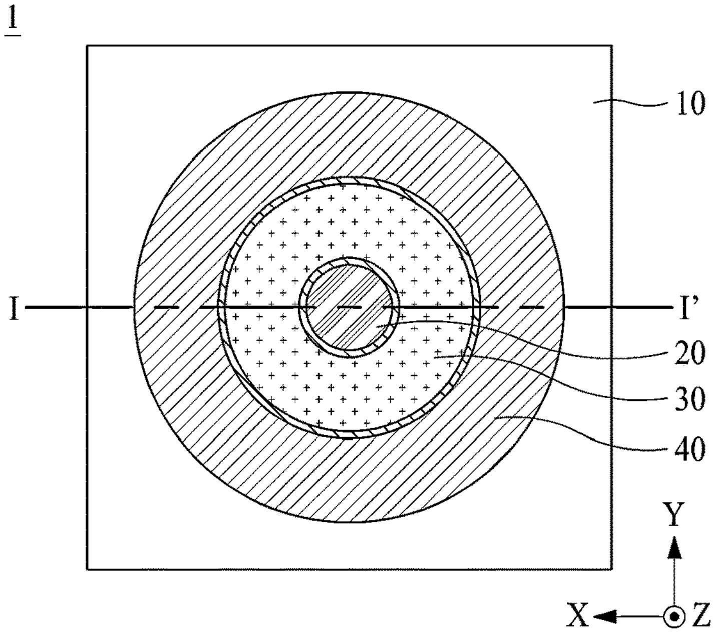
FIG. 1 illustrates a sound apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations may unnecessarily obscure aspects of the present disclosure, the detailed description thereof may be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals refer to like elements throughout unless stated otherwise. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and completely convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, embodiments of the present disclosure are not limited to the illustrated details. Like reference numerals refer to like elements throughout. In the following description, when the detailed description of the relevant known function or configuration is determined to unnecessarily obscure the important point of the present disclosure, the detailed description will be omitted. When the terms “comprise,” “have,” and “include,” “contain,” “constitute,” “make up of,” “formed of,” and the like are used, one or more other elements may be added unless the term, such as “only” is used. The terms of a singular form may include plural forms unless the context clearly indicates otherwise.

In construing an element, the element is construed as including an error or tolerance range even where explicit description of such an error or tolerance range is not provided.

In describing a position relationship, for example, when a position relation between two parts is described using “on,” “over,” “under,” “above,” “below,” “beneath,” “near,” “close to,” or “adjacent to,” “beside,” “next to,” or the like, one or more other parts may be disposed between the two parts unless a more limiting term, such as “immediate(ly),” “direct(ly),” or “close(ly)” is used. For example, when a structure is described as being positioned “on,” “over,” “under,” “above,” “below,” “beneath,” “near,” “close to,” or “adjacent to,” “beside,” or “next to” another structure, this description should be construed as including a case in which the structures contact each other as well as a case in which a third structure is disposed or interposed therebetween. Furthermore, the terms “front,” “rear,” “left,” “right,” “top,” “bottom, “downward,” “upward,” “upper,” “lower,” and the like refer to an arbitrary frame of reference.

In describing a time relationship, for example, when the temporal order is described as “after,” “subsequent,” “next,” “before,” “prior to,” or the like, a case that is not continuous may be included unless a more limiting term, such as “just,” “immediate(ly),” or “direct(ly)” is used.

It will be understood that, although the terms “first,” “second,” etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," or the like may be used. These terms are intended to identify the corresponding elements from the other elements, and basis, order, or number of the corresponding elements should not be limited by these terms. The expression that an element is "connected," "coupled," or "adhered" to another element or layer means that the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings. For convenience of description, a scale of each of elements illustrated in the accompanying drawings differs from a real scale, and thus, is not limited to a scale illustrated in the drawings.

Figure 2:
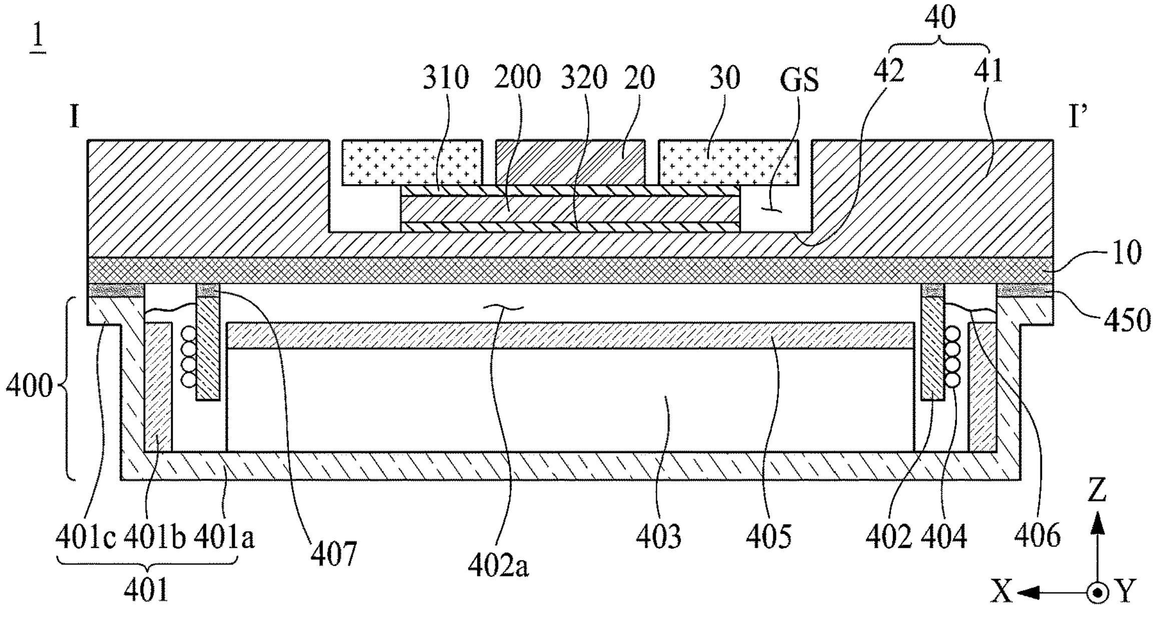
FIG. 2 is a cross-sectional view taken along line I-I' of FIG. 1.

FIG. 1 illustrates a sound apparatus according to an embodiment of the present disclosure. FIG. 2 is a cross-sectional view taken along line I-I' of FIG. 1.

Referring to FIGS. 1 and 2, the sound apparatus 1 according to an embodiment of the present disclosure may include a vibration apparatus and a vibration member. For example, the vibration member may be disposed at a supporting portion 10.

According to an embodiment of the present disclosure, the vibration member may include one or more vibration members. For example, the vibration member may include a first vibration member 20, a second vibration member 30, and a third vibration member 40.

For example, the second vibration member 30 may be at a periphery of the first vibration member 20. For example, the second vibration member 30 may be disposed apart from the first vibration member 20. For example, the second vibration member 30 may be disposed apart from the third vibration member 40 with a gap space interposed therebetween.

For example, the third vibration member 40 may be at a periphery of the second vibration member 30. The third vibration member 40 may be at a periphery of the first vibration member 20 and the second vibration member 30. The third vibration member 40 may surround the first vibration member 20 and the second vibration member 30. The third vibration member 40 may include a protrusion portion 41 and a concave portion 42. For example, the first vibration member 20 and the second vibration member 30 may be disposed in the concave portion 42 of the third vibration member 40.

For example, the second vibration member 30 may be disposed to protrude to the third vibration member 40. For example, the second vibration member 30 may be disposed to protrude to an outer portion of the first vibration apparatus 200. Therefore, a gap space GS may be formed between the first vibration apparatus 200 and the third vibration member 40. For example, the gap space GS may be provided between the concave portion 42 of the third vibration member 40 and/or the second vibration member 30. An apparatus for outputting a sufficient sound based on a vibration of the first vibration apparatus 200 by using the gap space GS may be provided. For example, a sound wave (or a sound pressure level) based on a vibration of the first vibration apparatus 200 may not be dispersed, and flow of air may be trapped in the gap space GS. Accordingly, the loss of a vibration of the first vibration apparatus 200 may be reduced or minimized, and thus, a sound pressure level characteristic and/or a sound characteristic of a sound generated based on a vibration of the second vibration member 30 may increase. For example, the gap space GS may be a vibration space based on driving of the first vibration apparatus 200 or may be a sound pressure level space (or a sounding portion) where a sound pressure level is generated based on a vibration of the first vibration apparatus 200, but embodiments of the present disclosure are not limited thereto.

According to an embodiment of the present disclosure, the vibration apparatus may include one or more vibration apparatuses. For example, the vibration apparatus may include the first vibration apparatus 200 and a second vibration apparatus 400.

For example, the first vibration apparatus 200 may be disposed on a rear surface of each of the first vibration member 20 and the second vibration member 30. The first vibration apparatus 200 may overlap one or more of the first vibration member 20 and the second vibration member 30. For example, the first vibration apparatus 200 may overlap all of the first vibration member 20.

For example, the second vibration member 30 may extend to one portion or one side of the first vibration apparatus 200. The first vibration apparatus 200 may overlap the second vibration member 30. For example, the first vibration apparatus 200 may overlap a portion of the second vibration member 30. The first vibration member 20 may be disposed at a center of the first vibration apparatus 200, and the second vibration member 30 may be disposed at an edge (or a periphery) of the first vibration apparatus 200. For example, the first vibration member 20 may be disposed at the center of the first vibration apparatus 200, and the second vibration member 30 may be disposed at both edges (or both peripheries) of the first vibration apparatus 200. The first vibration apparatus 200 may be disposed between the first vibration member 20, the second vibration member 30, and the third vibration member 40.

For example, the first vibration member 20, the second vibration member 30, and the first vibration apparatus 200 may be between adjacent third vibration members 40. For example, the third vibration member 40 may overlap the second vibration apparatus 400.

According to an embodiment of the present disclosure, the first vibration apparatus 200 may be a film type vibration apparatus. The first vibration apparatus 200 will be described below with reference to FIGS. 3 to 4F.

For example, the first vibration apparatus 200 may include a piezoelectric material. The first vibration apparatus 200 may include a ceramic material. For example, the first vibration apparatus 200 may include lead zirconate titanate (PZT), lead magnesium niobate-lead titanate (PMN-PT), lead zirconate niobite-lead titanate (PZN-PT), microfiber composites (MFC), $BaTiO_3$, $PbTiO_3$, Na—K—Nb (NKN), and polyvinylidene fluoride (PVDF), but embodiments of the present disclosure are not limited thereto.

According to an embodiment of the present disclosure, the first vibration member 20, the second vibration member 30, and the third vibration member 40 may include materials having different hardness. For example, the first vibration member 20, the second vibration member 30, and the third vibration member 40 may include materials for outputting sounds of different pitched sound bands and may configure a sound apparatus which outputs sounds of different pitched sound bands.

According to an embodiment of the present disclosure, the first vibration member 20 may include a material having hardness which differs from that of the second vibration member 30. For example, the first vibration member 20 may include a material which is higher in hardness than the second vibration member 30. For example, the first vibration member 20 may include ceramic, metal, diamond, synthetic resin, and silk, but embodiments of the present disclosure are not limited thereto. For example, the metal may be aluminum (Al), magnesium (Mg), titanium (Ti), and an alloy thereof, but embodiments of the present disclosure are not limited thereto. For example, the synthetic resin may be polypropylene, but embodiments of the present disclosure are not limited thereto. For example, the second vibration member 30 may be paper, metal, and synthetic resin, but embodiments of the present disclosure are not limited thereto. For example, the metal may be Al, Mg, Ti, and an alloy thereof, but embodiments of the present disclosure are not limited thereto. For example, the synthetic resin may be polypropylene, but embodiments of the present disclosure are not limited thereto.

According to an embodiment of the present disclosure, the first vibration member 20 and the second vibration member 30 may output a sound based on a vibration of the first vibration apparatus 200. For example, the first vibration member 20 and the second vibration member 30 may vibrate based on a driving signal of the first vibration apparatus 200 to output a sound. The first vibration member 20 and the second vibration member 30 may output sounds of different pitched sound bands. For example, the first vibration member 20 and the second vibration member 30 may include different materials, and thus, may output sounds of different pitched sound bands. For example, the first vibration member 20 may output a sound of a first pitched sound band, and the second vibration member 30 may output a sound of a pitched sound band which differs from the first pitched sound band. The first pitched sound band may be a sound of a high-pitched sound band. For example, the high-pitched sound band may be 3 kHz or more, but embodiments of the present disclosure are not limited thereto. For example, the first vibration member 20 may be a tweeter, but the terms are not limited thereto. The second pitched sound band may be a sound of a middle-pitched sound band. For example, the middle-pitched sound band may be 200 Hz to 3 kHz, but embodiments of the present disclosure are not limited thereto. For example, the second vibration member 30 may be a mid-range, but the terms are not limited thereto. For example, the first vibration apparatus 200 may vibrate the first vibration member 20 and the second vibration member 30, which output sounds of a middle-high pitched sound band, and thus, may output a sound of the middle-high pitched sound band.

According to an embodiment of the present disclosure, the first vibration apparatus 200 may output a sound toward a front surface of each of the first vibration member 20 and the second vibration member 30 by using the first vibration member 20 and the second vibration member 30 as vibration plates. For example, the first vibration apparatus 200 may generate a sound so that the sound travels toward the front surface of each of the first vibration member 20 and the second vibration member 30. The first vibration apparatus 200 may vibrate the first vibration member 20 and the second vibration member 30 to output a sound. For example, the first vibration apparatus 200 may directly vibrate the first vibration member 20 and the second vibration member 30 to output a sound. For example, the first vibration member 20 and the second vibration member 30 may each be a vibration plate or an active vibration member, but embodiments of the present disclosure are not limited thereto. For example, the first vibration apparatus 200 may vibrate the first vibration member 20 and the second vibration member 30 to output a sound of the first pitched sound band and a sound of the second pitched sound band which differ. For example, the first vibration apparatus 200 may vibrate the first vibration member 20 and the second vibration member 30 to output a sound of the first pitched sound band and a sound of the second pitched sound band which differs from the sound of the first pitched sound band.

According to an embodiment of the present disclosure, the second vibration apparatus 400 may be disposed on a rear surface of the third vibration member 40. For example, the second vibration apparatus 400 may overlap the third vibration member 40.

According to an embodiment of the present disclosure, the second vibration apparatus 400 may be a coil type vibration apparatus.

For example, the second vibration apparatus 400 may include a bobbin 402, a magnet member 403, and a coil 404. The second vibration apparatus 400 may further include a frame 401, a center pole 405, and a damper 406.

The frame 401 may include a frame body 401*a*, an upper plate 401*b*, and a fixing bracket 401*c*.

The frame body 401*a* may be a lower plate which supports the magnet member 403. The upper plate 401*b* may be disposed at a front edge (or a front periphery) of the frame body 401*a* to have a cylindrical shape including a hollow portion. The frame body 401*a* and the upper plate 401*b* may be provided as one body having a U-shape. For example, the frame body 401*a* and the upper plate 401*b* may be referred to as other terms such as a yoke.

The fixing bracket 401*c* may protrude from a lateral surface of the upper plate 401*b*. The fixing bracket 401*c* may be fixed to the supporting portion 10 by an adhesive member. Therefore, the frame 401 may be fixed or connected to the supporting portion 10. For example, the adhesive member 450 may include a single-sided tape, a single-sided adhesive pad, a single-sided adhesive gap pad, a single-sided adhesive foam pad, a double-sided tape, a double-sided adhesive pad, a double-sided adhesive gap pad, or a double-sided adhesive foam pad, but embodiments of the present disclosure are not limited thereto.

The bobbin 402 may be disposed on the frame 401. The bobbin 402 according to an embodiment of the present disclosure may be implemented to include a hollow portion 402*a* and may be connected or coupled to a rear surface of the supporting portion 10. For example, the bobbin 402 may be implemented as a ring-shaped (or cylindrical) structure which is formed of a material produced by processing pulp or paper, Al or Mg or an alloy thereof, synthetic resin such as polypropylene, or polyamide-based fiber, but embodiments of the present disclosure are not limited thereto. The bobbin 402 may vibrate (for example, perform a vertical reciprocating motion) based on a magnetic force to vibrate the third vibration member 40.

The bobbin 402 according to an embodiment of the present disclosure may have a circular shape or an oval shape, but embodiments of the present disclosure are not limited thereto. The bobbin 402 having an oval shape may have an elliptical shape, a rectangular shape with rounded corners, or non-circular curved shape having a width different from its height, but embodiments of the present disclosure are not limited thereto. For example, in the bobbin 402 having the oval shape, a ratio of a long-axis diameter to a short-axis diameter may be adjusted to 1.3:1 to 2:1. The bobbin 402 having the oval shape may more improve a sound of a high sound band than a circular shape and may decrease the occurrence of heat caused by a vibration, and thus, may have an excellent heat dissipation characteristic.

The magnet member 403 may be disposed on the frame 401. The magnet member 403 may be provided inside or outside the bobbin 420. For example, the magnet member 403 may be disposed on the frame 401 so as to be accommodated into the hollow portion 402*a* of the bobbin 402. The magnet member 403 may be a permanent magnet which is inserted or accommodated into the hollow portion 402*a* of the bobbin 402. The magnet member 403 according to an embodiment of the present disclosure may be implemented with a sintered magnet such as barium ferrite, and a material of the magnet member 403 may include one or more of $Fe_2O_3$, $BaCO_3$, a neodymium magnet, strontium ferrite with improved magnet component, an alloy cast magnet including Al, nickel (Ni), and cobalt (Co), but embodiments of the present disclosure are not limited thereto. For example, the neodymium magnet may be neodymium-iron-boron (Nd—Fe—B), but embodiments of the present disclosure are not limited thereto.

The coil 404 may be wound to surround an outer perimeter surface of the bobbin 732 and may be supplied with a sound signal (or a voice signal) from the outside. When a sound signal (or a current) is applied to the coil 404, a whole portion of the bobbin 402 may vibrate (for example, perform a vertical reciprocating motion) according to Fleming's left-hand law based on an application magnetic field generated around the coil 402 and an external magnetic field generated around the magnet member 403. The coil 404 may be raised and lowered along with the bobbin 402. For example, the coil 404 may be referred to as a voice coil, but embodiments of the present disclosure are not limited thereto.

The center pole 405 may be disposed on the magnet member 403. The center pole 405 may guide a vibration of the bobbin 402. For example, the center pole 405 may be inserted or accommodated into the hollow portion 402*a* of the bobbin 402, and thus, may be surrounded by the bobbin 402. For example, the center pole 405 may be referred to as an elevation guider or pole pieces, but embodiments of the present disclosure are not limited thereto.

The damper 406 may be disposed between the frame 401 and the bobbin 402. The damper 406 according to an embodiment of the present disclosure may be disposed between the frame body 401*a* of the frame 401 and an upper outer perimeter surface of the bobbin 402. The damper 406 may be provided in a structure which is creased between one end and the other end thereof, and thus, may be contracted and relaxed based on a vibration of the bobbin. The damper 406 may limit a vibration distance (or a vertical movement distance) of the bobbin 402 by using a restoring force. For example, when the bobbin 402 moves by a certain distance or more or vibrates by a certain distance or less, the bobbin 402 may be restored to an original position with the restoring force of the damper 406. For example, the damper 736 may be referred to as other term such as a spider, a suspension, or an edge, but the terms are not limited thereto.

The second vibration apparatus 400 according to an embodiment of the present disclosure may be implemented as an internal magnet type (or a micro type) where the magnet member 403 is inserted or accommodated into the hollow portion 402*a* of the bobbin 402.

The second vibration apparatus 400 according to another embodiment of the present disclosure may be implemented as an external magnet type (or a dynamic type) where the magnet member 403 is disposed to surround an outer side or outer portion of the bobbin 402. Here, except for that the magnet member 403 is provided between a lower plate 401*a* and an upper plate 401*b* and the center pole 405 is provided on the lower plate 401*a* so as to be inserted or accommodated into the hollow portion 402*a* of the bobbin 402, the second vibration apparatus 400 having the external magnet type is the same as a vibration apparatus having the internal magnet type, and thus, its detailed description is omitted.

The second vibration apparatus 400 according to an embodiment of the present disclosure may further include a bobbin protection member 407 which is disposed between an upper portion of the bobbin 402 and the supporting portion 10.

The bobbin protection member 407 may be provided in a cylindrical structure including an opening portion which overlaps the hollow portion 402*a* of the bobbin 402. For example, the bobbin protection member 407 may be coupled to an upper surface of the bobbin 402. The bobbin protection member 407 may cover the upper surface of the bobbin 402 to protect the bobbin 402, thereby preventing the bobbin 402 from being deformed by an external impact.

The bobbin protection member 407 according to an embodiment of the present disclosure may be configured in a molding form of an injection material or metal. For example, the bobbin protection member 407 may include fiber reinforced plastics, composite resin including fiber reinforced plastics, or metal, and in this case, may perform a heat dissipation function of dissipating heat which occurs when the second vibration apparatus 400 is driven. The fiber reinforced plastics may be one of carbon fiber reinforced plastics (CFRP), glass fiber reinforced plastics (GFRP), graphite fiber reinforced plastics (GFRP), or a combination thereof, but embodiments of the present disclosure are not limited thereto.

The bobbin protection member 407 according to an embodiment of the present disclosure may be coupled to the bobbin 402 by a double-sided tape or adhesive resin. For example, the adhesive resin may be epoxy resin or acryl resin, but embodiments of the present disclosure are not limited thereto.

The bobbin protection member 407 according to another embodiment of the present disclosure may be coupled or connected to the supporting portion 10 by a double-sided tape or adhesive resin.

According to another embodiment of the present disclosure, the bobbin protection member 407 may be omitted. In this case, the bobbin protection member 407 may be an adhesive member. The adhesive member may be coupled or connected to the supporting portion 10 and the bobbin 402. For example, the adhesive member may be epoxy resin or acryl resin, but embodiments of the present disclosure are not limited thereto.

According to an embodiment of the present disclosure, the second vibration apparatus 400 may be disposed on a rear surface of the supporting portion 10. For example, the supporting portion 10 may be a vibration plate which is connected to the bobbin 402 and the coil 404 of the second vibration apparatus 400. For example, the supporting portion 10 may be connected to the bobbin 402 and the coil 404 of the second vibration apparatus 400 and may be configured in a honey cone structure. According to another embodiment of the present disclosure, the bobbin 402 and the coil 404 of the second vibration apparatus 400 may be connected to the third vibration member 40, and in this case, the supporting portion 10 may be omitted.

According to an embodiment of the present disclosure, the bobbin of the second vibration apparatus 400 may overlap the third vibration member 40. For example, the bobbin of the second vibration apparatus 400 may overlap the protrusion portion 41 of the third vibration member 40. The second vibration apparatus 400 may vibrate an edge (or a periphery) of the third vibration member 40.

According to an embodiment of the present disclosure, the third vibration member 40 may include a material having hardness which differs from that of the first vibration member 20 and/or the second vibration member 30. For example, the third vibration member 40 may include a material which is lower in hardness than the second vibration member 30. The third vibration member 40 may be paper, metal, and synthetic resin, but embodiments of the present disclosure are not limited thereto. For example, the metal may be Al, Mg, Ti, and an alloy thereof, but embodiments of the present disclosure are not limited thereto. For example, the synthetic resin may be polypropylene, but embodiments of the present disclosure are not limited thereto.

According to an embodiment of the present disclosure, the third vibration member 40 may output a sound based on a vibration of the second vibration apparatus 400. For example, the third vibration member 40 may vibrate based on a driving signal of the second vibration apparatus 400 to output a sound. The third vibration member 40 may output a sound of a pitched sound band which differs from that of the first vibration member 20 and/or the second vibration member 30. For example, the third vibration member 40 and the first vibration member 20 and/or the second vibration member 30 may include different materials, and thus, may output sounds of different pitched sound bands. For example, the third vibration member 40 may output a sound of a pitched sound band which differs from that of the first vibration member 20 and/or the second vibration member 30. For example, the third vibration member 40 may output a sound of a third pitched sound band. For example, the third vibration member 40 may output a sound of the third pitched sound band which differs from a sound of the first pitched sound band of the first vibration member 20 and/or a sound of the second pitched sound band of the second vibration member 30. The third pitched sound band may be a low-pitched sound band. For example, the low-pitched sound band may be 200 Hz or less, but embodiments of the present disclosure are not limited thereto. For example, the third vibration member 40 may be a woofer, but the terms are not limited thereto. For example, the second vibration apparatus 400 may vibrate the third vibration member 40 which outputs a sound of the low-pitched sound band, and thus, may output a sound of the low-pitched sound band.

According to an embodiment of the present disclosure, the second vibration apparatus 400 may output a sound toward a front surface of the third vibration member 40 by using the third vibration member 40 as a vibration plate. For example, the second vibration apparatus 400 may generate a sound so that the sound travels toward the front surface of the third vibration member 40. The second vibration apparatus 400 may vibrate the third vibration member 40 to output a sound. For example, the second vibration apparatus 400 may directly vibrate the third vibration member 40 to output a sound. For example, the third vibration member 40 may be a vibration plate or an active vibration member, but embodiments of the present disclosure are not limited thereto. For example, the second vibration apparatus 400 may vibrate the third vibration member 40 to output a sound of a third pitched sound band which differs from a sound of the first pitched sound band and a sound of the second pitched sound band.

According to an embodiment of the present disclosure, the first vibration member 20 may output a sound of the high-pitched sound band, the second vibration member 30 may output a sound of the middle-pitched sound band, and the third vibration member 40 may output a sound of the low-pitched sound band, thereby providing an apparatus for outputting a pitched sound band of 200 Hz to 120 kHz which is a full-range pitched sound band.

According to an embodiment of the present disclosure, a vibration member which vibrates based on a vibration of at least one vibration apparatus may be configured to output sounds of different pitched sound bands, thereby providing an apparatus which outputs sounds of different pitched sound bands. In the present disclosure, the sound apparatus 1 may be a vibration apparatus, a vibration generating apparatus, a displacement apparatus, a sound apparatus, or a sound generating apparatus, but the terms are not limited thereto.

The sound apparatus 1 according to an embodiment of the present disclosure may further include a first adhesive member 310 and a second adhesive member 320.

For example, the first adhesive member 310 may be disposed on a first surface of the first vibration apparatus 200. For example, the first adhesive member 310 may be disposed on a second surface, which is opposite to the first surface, of the first vibration apparatus 200.

For example, the first adhesive member 310 may be disposed between the first and second vibration members 20 and 30 and the first vibration apparatus 200. The first adhesive member 310 may overlap one or more of the first and second vibration members 20 and 30. For example, the first adhesive member 310 may overlap one or more of the first and second vibration members 20 and 30. For example, the first adhesive member 310 may overlap all of the first vibration member 20. For example, the first adhesive member 310 may overlap a portion of the second vibration member 30. The first vibration member 20 may be disposed at a center of the first adhesive member 310, and the second vibration member 30 may be disposed at an edge (or a periphery) of the first adhesive member 310. For example, the first vibration member 20 may be disposed at the center of the first adhesive member 310, and the second vibration member 30 may be disposed at both edges (or both peripheries) of the first adhesive member 310.

For example, the second adhesive member 320 may be disposed between the third vibration member 40 and the first vibration apparatus 200. For example, the second adhesive member 320 may overlap a portion of the third vibration member 40.

According to an embodiment of the present disclosure, a modulus (for example, young's modulus) of the first adhesive member 310 may differ from that of the second adhesive member 320. For example, a modulus of the first adhesive member 310 may be greater than that of the second adhesive member 320. Therefore, the first adhesive member 310 having a high modulus may transfer a vibration of the first vibration apparatus 200 to the first vibration member 20 and the second vibration member 30 without attenuation. The second adhesive member 320 having a low modulus may isolate and damp a vibration generated in the third vibration member 40. For example, a modulus of the first adhesive member 310 may be 4 kPa to 100 kPa at a room temperature, but embodiments of the present disclosure are not limited thereto. For example, a modulus of the second adhesive member 320 may be 4 kPa to 100 kPa at a room temperature, but embodiments of the present disclosure are not limited thereto.

For example, one or more of the first and second adhesive members 310 and 320 may include an optically clear adhesive (OCA) and an optically clear resin (OCR), but embodiments of the present disclosure are not limited thereto. For example, the first adhesive member 310 may include an acrylic material, a silicone-based material, and a urethane-based material, but embodiments of the present disclosure are not limited thereto. For example, the second adhesive member 320 may include an acrylic material, a silicone-based material, and a urethane-based material, but embodiments of the present disclosure are not limited thereto.

According to an embodiment of the present disclosure, one or more vibration members which output sounds of different pitched sound bands may be configured or one or more divided vibration members may be configured and one or more vibration apparatuses which vibrate one or more vibration members may be configured, and thus, the sound apparatus 1 (or a vibration apparatus) having a full range may be implemented.

A sound apparatus 3 according to another embodiment of the present disclosure may include an adhesive member having a different modulus, thereby providing a sound apparatus or a vibration apparatus having an enhanced sound characteristic and/or sound pressure level characteristic.

For example, because a separate woofer is not disposed for implementing a sound of a low-pitched sound band of a film type vibration apparatus, the degree of freedom in design of a sound apparatus or a vibration apparatus may be enhanced. For example, in the apparatus according to the embodiments of the present disclosure, at least one vibration member for outputting a sound of a full range pitched sound band may be configured, thereby providing an apparatus including a sound apparatus or a vibration apparatus which is thin in thickness and is miniaturized. For example, at least one vibration member for outputting a sound of the full range pitched sound band may be configured with one sound apparatus or one vibration apparatus, thereby providing an apparatus including a sound apparatus or a vibration apparatus which is thin in thickness and is miniaturized.

Figure 3:
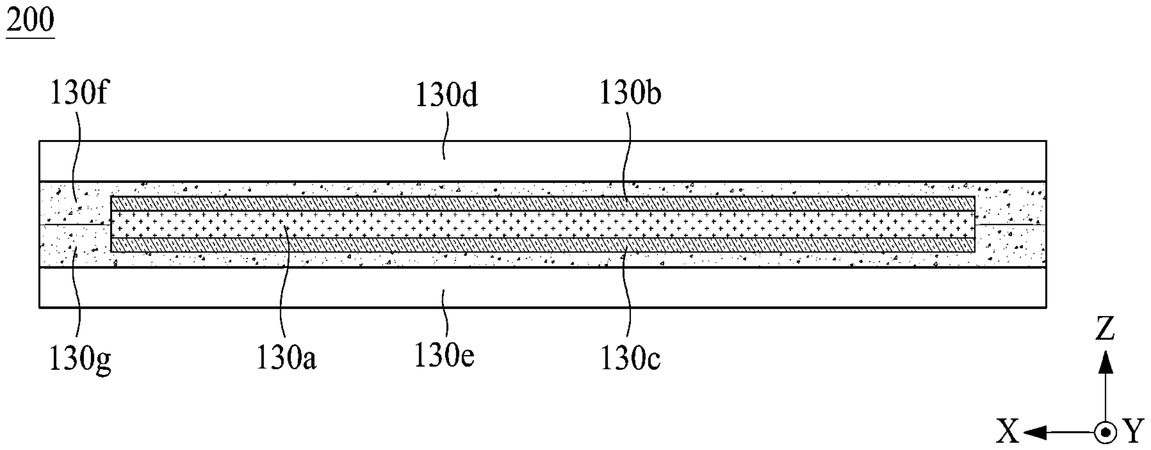
FIG. 3 illustrates a sound apparatus according to an embodiment of the present disclosure.

FIG. 3 illustrates a vibration apparatus according to an embodiment of the present disclosure. FIGS. 4A to 4F illustrate a vibration portion of a vibration apparatus according to an embodiment of the present disclosure.

The first vibration apparatus 200 according to an embodiment of the present disclosure may be referred to as a flexible vibration structure, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film type piezoelectric composite actuator, a film speaker, a film type piezoelectric speaker, or a film type piezoelectric composite speaker, but the terms are not limited thereto.

Referring to FIG. 3, a vibration apparatus 130 (e.g., the first vibration apparatus 200 shown in FIG. 2) may include a vibration portion 130*a*, a first electrode portion 130*b*, and a second electrode portion 130*c*.

The vibration portion 130*a* according to an embodiment of the present disclosure may include a piezoelectric material. For example, the vibration portion 130*a* may include one or more of a piezoelectric inorganic material and a piezoelectric organic material.

For example, the vibration portion 130*a* may include a piezoelectric material (or an electro active material) having a piezoelectric effect. For example, the piezoelectric material may have a characteristic where pressure or twisting is applied to a crystalline structure by an external force, a potential difference occurs due to dielectric polarization caused by a relative position change of a positive (+) ion and a negative (−) ion, and a vibration is generated by an electric field based on a voltage applied thereto. The vibration portion 130*a* may be referred to as the terms such as a vibration layer, a piezoelectric layer, a piezoelectric material layer, an electro active layer, a vibration portion, a piezoelectric material portion, an electro active portion, a piezoelectric structure, a piezoelectric composite layer, a piezoelectric composite, or a piezoelectric ceramic composite, but the terms are not limited thereto. The vibration portion 130*a* may include a transparent conductive material, a semitransparent conductive material, or an opaque conductive material and may be transparent, semitransparent, or opaque.

The first vibration apparatus 200 or the vibration portion 130*a* according to an embodiment of the present disclosure may include a ceramic-based material for implementing a relatively high vibration, or may include a piezoelectric ceramic having a perovskite-based crystalline structure. The perovskite crystalline structure may have a piezoelectric effect and an inverse piezoelectric effect, and may be a plate-shaped structure having orientation. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A" and "B" may be cations, and "0" may be anions. For example, the first portions 31*a* may include one or more of lead(II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

According to an embodiment of the present disclosure, the first vibration apparatus 200 or the vibration portion 130*a* may include a lead zirconate titanate (PZT)-based material including lead (Pb), zirconium (Zr), and titanium (Ti) or may include a lead zirconate nickel niobate (PZNN)-based material including lead (Pb), zinc (Zn), nickel (Ni), and niobium (Nb), but is not limited thereto. In another embodiment, the first vibration apparatus 200 or the vibration portion 130*a* may include at least one of $CaTiO_3$, $BaTiO_3$, and $SrTiO_3$ including no Pb, but is not limited thereto.

The first electrode portion 130*b* may be disposed on a first surface (or an upper surface) of the vibration portion 130*a* and may be electrically connected to the first surface of the vibration portion 130*a*. The second electrode portion 130*c* may be disposed on a surface which differs from the first surface of the vibration portion 130*a*. For example, the second electrode portion 130*c* may be disposed on a second surface (or a lower surface) of the vibration portion 130*a* and may be electrically connected to the second surface of the vibration portion 130*a*. For example, the vibration portion 130*a* may be polarized (or falling) by a certain voltage applied to the first electrode portion 130*b* and the second electrode portion 130*c* in a certain temperature atmosphere or a temperature atmosphere which is changed from a high temperature to a room temperature, but embodiments of the present disclosure are not limited thereto.

For example, the first electrode portion 130*b* may have a single electrode form where the first electrode portion 130*b* is disposed on the whole first surface of the vibration portion 130*a*. The first electrode portion 130*b* according to an embodiment of the present disclosure may include a transparent conductive material, a semitransparent conductive material, or an opaque conductive material. For example, the transparent conductive material or the semitransparent conductive material may include indium tin oxide (ITO) or indium zinc oxide (IZO), but is not limited thereto. The opaque conductive material may include aluminum (Al), copper (Cu), gold (Au), molybdenum (Mo), magnesium (Mg), or an alloy thereof, but embodiments of the present disclosure are not limited thereto.

The second electrode portion 130*c* may be disposed on the second surface (or a rear or backside surface), which is opposite to or different from the first surface, of the vibration portion 130*a* and may be electrically connected to the second surface of the vibration portion 130*a*. For example, the second electrode portion 130*c* may have a single electrode form where the second electrode portion 130*c* is disposed on the whole second surface of the vibration portion 130*a*. The second electrode portion 130*c* according to an embodiment of the present disclosure may include a transparent conductive material, a semitransparent conductive material, or an opaque conductive material. For example, the second electrode portion 130*c* may include the same material as that of the first electrode portion 130*b*, but is not limited thereto. In another embodiment of the present disclosure, the second electrode portion 130*c* may include a material which differs from that of the first electrode portion 130*b*.

The first vibration apparatus 200 according to an embodiment of the present disclosure may further include a first cover member 130*d* and a second cover member 130*e*.

The first cover member 130*d* may be disposed on a first surface of the vibration portion 130*a*. For example, the first cover member 130*d* may be provided in the first electrode portion 130*b*. For example, the first cover member 130*d* may be provided on the first electrode portion 130*b*. For example, the first cover member 130*d* may cover the first electrode portion 130*b* disposed on the first surface of the vibration portion 130*a*, and thus, may protect the first surface of the vibration portion 130*a* or the first electrode portion 130*b*.

The second cover member 130*e* may be disposed on a second surface of the vibration portion 130*a*. For example, the second cover member 130*e* may be provided in the second electrode portion 130*c*. For example, the second cover member 130*e* may be provided under the second electrode portion 130*c*. For example, the second cover member 130*e* may cover the second electrode portion 130*c* disposed on the second surface of the vibration portion 130*a*, and thus, may protect the second surface of the vibration portion 130*a* or the second electrode portion 130*c*.

Each of the first cover member 130*d* and the second cover member 130*e* according to an embodiment of the present disclosure may include one or more materials of plastic, fiber, and wood, but is not limited thereto. For example, each of the first cover member 130*d* and the second cover member 130*e* may include the same material or different materials. For example, each of the first cover member 130*d* and the second cover member 130*e* may be a polyimide film or a polyethylene terephthalate film, but embodiments of the present disclosure are not limited thereto.

The vibration apparatus 130 according to an embodiment of the present disclosure may further include a first adhesive layer 130*f* and a second adhesive layer 130*g*. For example, the first adhesive layer 130*f* may be disposed between the first cover member 130*d* and the first electrode portion 130*b*. For example, the second adhesive layer 130*g* may be disposed between the second cover member 130*e* and the second electrode portion 130*c*.

The first cover member 130*d* according to an embodiment of the present disclosure may be in the first electrode portion 130*b*. For example, the first cover member 130*d* may be disposed on the first surface of the vibration portion 130*a* by using the first adhesive layer 130*f* For example, the first cover member 130*d* may be connected or coupled to the first electrode portion 130*b* by using the first adhesive layer 130*f* For example, the first cover member 130*d* may be disposed on the first surface of the vibration portion 130*a* by a film laminating process using the first adhesive layer 130*f* Accordingly, the vibration portion 130*a* may be integrated (or disposed) into the first cover member 130*d*.

The second cover member 130*e* according to an embodiment of the present disclosure may be in the second electrode portion 130*c*. For example, the second cover member 130*e* may be disposed on the second surface of the vibration portion 130*a* by using the second adhesive layer 130*g*. For example, the second cover member 130*e* may be connected or coupled to the second electrode portion 130*c* by using the second adhesive layer 130*g*. For example, the second cover member 130*e* may be disposed on a second surface of the vibration portion 130*a* by a film laminating process using the second adhesive layer 130*g*. Accordingly, the vibration portion 130*a* may be integrated (or disposed) into the second cover member 130*e*.

For example, the first adhesive layer 130*f* and the second adhesive layer 130*g* may be fully surrounded by the vibration portion 130*a*. For example, the first adhesive layer 130*f* and the second adhesive layer 130*g* may be disposed between the first cover member 130*d* and the second cover member 130*e* to surround the vibration portion 130*a*, the first electrode portion 130*b*, and the second electrode portion 130*c*. For example, the first adhesive layer 130*f* and the second adhesive layer 130*g* may be disposed between the first cover member 130*d* and the second cover member 130*e* to fully surround the vibration portion 130*a*, the first electrode portion 130*b*, and the second electrode portion 130*c*. For example, the vibration portion 130*a*, the first electrode portion 130*b*, and the second electrode portion 130*c* may be buried or embedded between the first adhesive layer 130*f* and the second adhesive layer 130*g*. For convenience of description, the first adhesive layer 130*f* and the second adhesive layer 130$g$ are illustrated, or are not limited thereto and may be provided as one adhesive layer.

Each of the first adhesive layer 130$f$ and the second adhesive layer 130$g$ according to an embodiment of the present disclosure may include an electrical insulation material which has adhesive properties and is capable of compression and decompression. For example, each of the first adhesive layer 130$f$ and the second adhesive layer 130$g$ may include epoxy resin, acryl resin, silicone resin, or urethane resin, but embodiments of the present disclosure are not limited thereto.

The first vibration apparatus 200 according to an embodiment of the present disclosure may further include a signal cable.

The signal cable may be electrically connected to the pad portion disposed in the first vibration apparatus 200 and may supply the first vibration apparatus 200 with a vibration driving signal (or a sound signal) provided from a sound processing circuit. The signal cable according to an embodiment may include a terminal, and the terminal may be electrically connected to a pad electrode of the pad portion. For example, the signal cable may be configured as a flexible cable, a flexible printed circuit cable, a flexible flat cable, a single-sided flexible printed circuit, a single-sided flexible printed circuit board (PCB), a flexible multi-layer printed circuit, or a flexible multi-layer PCB, but is not limited thereto. For example, the signal cable may be configured to be transparent, semitransparent, or opaque.

The sound processing circuit may generate an alternating current (AC) vibration driving signal including a first vibration driving signal and a second vibration driving signal based on sound data. The first vibration driving signal may be one of a positive (+) vibration driving signal and a negative (−) vibration driving signal, and the second vibration driving signal may be one of the positive (+) vibration driving signal and the negative (−) vibration driving signal. For example, the first vibration driving signal may be supplied to the first electrode portion 130$b$ of the first vibration apparatus 200 through the terminal of the signal cable, the pad electrode of the pad portion, and a first power supply line. The second vibration driving signal may be supplied to the second electrode portion 130$c$ of the first vibration apparatus 200 through the terminal of the signal cable, the pad electrode of the pad portion, and a second power supply line.

According to an embodiment of the present disclosure, the vibration portion 130$a$ may be provided as one body by the first and second cover members 130$d$ and 130$e$, thereby providing the vibration apparatus 130 having a simplified structure and a thin thickness.

Referring to FIGS. 4A to 4F, a vibration portion 130$a$ of a first vibration apparatus 200 according to another embodiment of the present disclosure may include a first portion 31$a$ and a second portion 31$b$. The first electrode portion, the second electrode portion, the first cover member, the second cover member, the first adhesive layer, and the second adhesive layer described above with reference to FIG. 3 may be identically configured.

The vibration portion 130$a$ according to an embodiment of the present disclosure may include a plurality of first portions 31$a$ and a plurality of second portions 31$b$. The vibration portion 130$a$ may include the plurality of first portions 31$a$ and the plurality of second portions 31$b$ between the plurality of first portions 31$a$. Each of the plurality of first portions 31$a$ may include one or more of a piezoelectric inorganic material and a piezoelectric organic material.

For example, the first portion 31$a$ may include an inorganic material, and the second portion 31$b$ may include an organic material. For example, the first portion 31$a$ may have a piezoelectric material, and the second portion 31$b$ may have a ductile characteristic or flexibility. For example, the inorganic material of the first portion 31$a$ may have a piezoelectric characteristic, and the organic material of the second portion 31$b$ may have a ductile characteristic or flexibility. For example, the plurality of first portions 31$a$ and the plurality of second portions 31$b$ may be alternately and repeatedly arranged in a second direction Y. Each of the plurality of first portions 31$a$ may be disposed between two adjacent second portions 31$b$ of the plurality of second portions 31$b$.

Figure 4A:
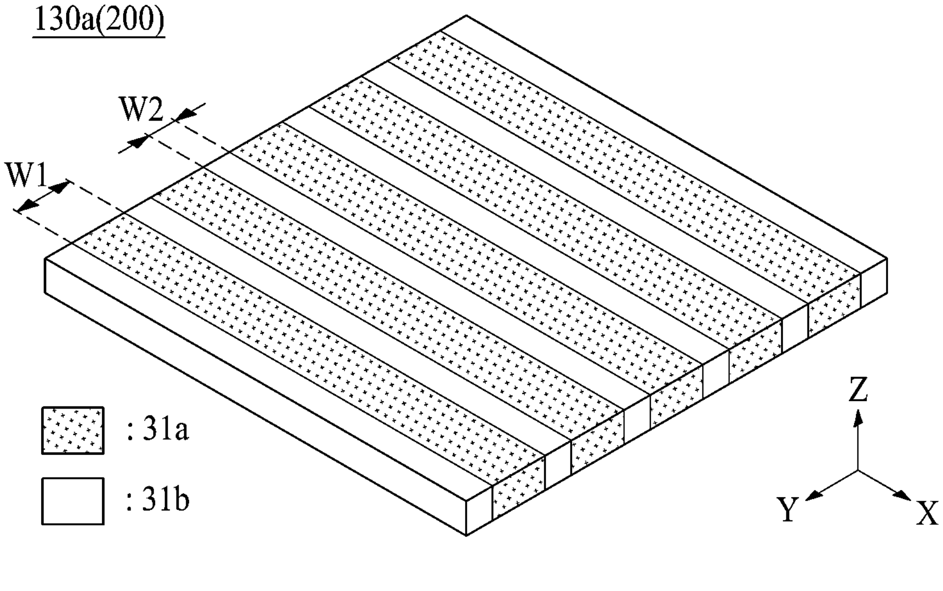
FIGS. 4A to 4F illustrate a vibration portion of a sound apparatus according to an embodiment of the present disclosure.

Referring to FIG. 4A, each of the plurality of first portions 31$a$ may have a first width W1 parallel to the second direction Y and a length parallel to the first direction X. Each of the plurality of second portions 31$b$ may be disposed in parallel to the second direction Y. For example, each of the plurality of second portions 31$b$ may have a second width W2 and may have a length parallel to the first direction X. For example, each of the plurality of second portions 31$b$ may have the same size (for example, width, area, or volume). For example, each of the plurality of second portions 31$b$ may have the same size (for example, width, area, or volume) within a process error (or an allowable error) occurring in a manufacturing process. The first width W1 may be the same as or different from the second width W2. For example, the first width W1 may be greater than the second width W2. For example, the first portion 31$a$ and the second portion 31$b$ may include a line shape or a stripe shape having the same size or different sizes. Accordingly, the vibration portion 130$a$ illustrated in FIG. 4A may have a 2-2 composite structure, and thus, may have a resonance frequency of 20 kHz or less, but the present disclosure is not limited thereto. For example, the resonance frequency of the vibration portion 130$a$ may vary based on one or more of a shape, a length, and a thickness of the vibration portion.

For example, the first portion 31$a$ may be a piezoelectric portion, a piezoelectric element, an inorganic portion, an inorganic material portion, a piezoelectric layer, a vibration layer, a displacement layer, or a displacement element, but the terms are not limited thereto. For example, the second portion 31$b$ may be a ductile portion, an elastic portion, a flexible portion, an organic portion, an organic material portion, a damping portion, a bending portion, or a bounce portion, but the terms are not limited thereto.

Figure 4B:
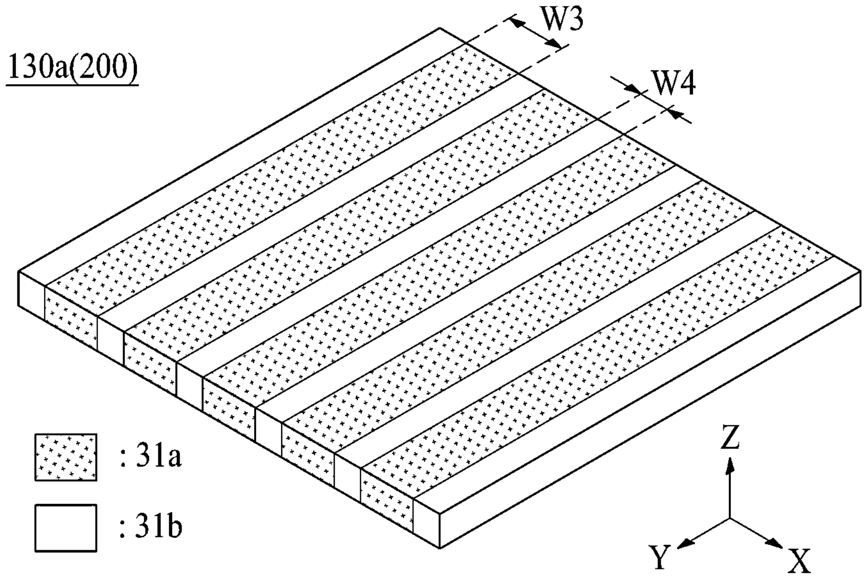

Referring to FIG. 4B, a vibration portion 130$a$ according to another embodiment of the present disclosure may include a plurality of first portions 31$a$ and a plurality of second portions 31$b$ which are alternately and repeatedly arranged in a first direction X. Each of the plurality of first portions 31$a$ may be disposed between two adjacent second portions 31$b$ of the plurality of second portions 31$b$. For example, each of the plurality of first portions 31$a$ may have a third width W3 parallel to the first direction X and may have a length parallel to a second direction Y. Each of the plurality of second portions 31$b$ may have a fourth width W4 parallel to the first direction X and may have a length parallel to the second direction Y. The third width W3 may be the same as or different from the fourth width W4. For example, the third width W3 may be greater than the fourth width W4. For example, the first portion 31$a$ and the second portion 31$b$ may include a line shape or a stripe shape having the same size or different sizes. Accordingly, the vibration portion 130$a$ illustrated in FIG. 4B may have a 2-2 composite structure, and thus, may have a resonance frequency of 20 kHz or less, but the present disclosure is not limited thereto. For example, the resonance frequency of the vibration portion 130*a* may vary based on one or more of a shape, a length, and a thickness of the vibration portion.

In the vibration portion 130*a* illustrated in FIGS. 4A and 4B, the plurality of first portions 31*a* and the plurality of second portions 31*b* may be disposed (or arranged) in parallel on the same plane (or the same layer). Each of the plurality of second portions 31*b* may be configured to fill a gap between two adjacent first portions 31*a*. Each of the plurality of second portions 31*b* may be connected to or attached on an adjacent first portion 31*a*. Accordingly, the vibration portion 130*a* may extend by a desired size or length based on lateral coupling (or connection) of the first portion 31*a* and the second portion 31*b*.

In the vibration portion (or the vibration layer) 31*a* illustrated in FIGS. 4A and 4B, the width W2 and the fourth width W4 of each of the plurality of second portions 31*b* may decrease progressively in a direction from a center portion of the vibration portion 130*a* or the first vibration apparatus 200 to both edge portions (or both ends or both peripheries) thereof.

According to an embodiment of the present disclosure, when the vibration portion 130*a* or the first vibration apparatus 200 vibrates in a vertical direction Z (or a thickness direction), a second portion 31*b* having a largest width W2 or W4 among the plurality of second portions 31*b* may be disposed at a portion on which a largest stress concentrates. When the vibration portion 130*a* or the first vibration apparatus 200 vibrates in the vertical direction Z, a second portion 31*b* having a smallest width W2 or W4 among the plurality of second portions 31*b* may be disposed at a portion where a relatively smallest stress occurs. For example, the second portion 31*b* having the largest width W2 or W4 among the plurality of second portions 31*b* may be disposed at a center portion of the vibration portion 130*a*, and the second portion 31*b* having the smallest width W2 or W4 among the plurality of second portions 31*b* may be disposed at both edge portions (or both peripheries portions) of the vibration portion 130*a*. Accordingly, when the vibration portion 130*a* or the first vibration apparatus 200 vibrates in the vertical direction Z, an overlap of a resonance frequency or interference of a sound wave occurring at a portion on which a largest stress concentrates may be reduced or minimized, and thus, dipping of a sound pressure level occurring in a low-pitched sound band may be reduced. For example, the flatness of a sound characteristic may be a magnitude of a deviation between a highest sound pressure level and a lowest sound pressure level.

In the vibration portion 130*a* illustrated in FIGS. 4A and 4B, the plurality of first portions 31*a* may have different sizes (or widths). For example, a size (or a width) of each of the plurality of first portions 31*a* may decrease or increase progressively in a direction from the center portion of the vibration portion 130*a* or the first vibration apparatus 200 to both edge portions (or both ends or both peripheries portions) thereof. In this case, a sound pressure level characteristic of a sound of the vibration portion 130*a* may be enhanced by various unique vibration frequencies based on vibrations of the plurality of first portions 31*a* having different sizes, and a reproduction band of a sound may extend.

Figure 4C:
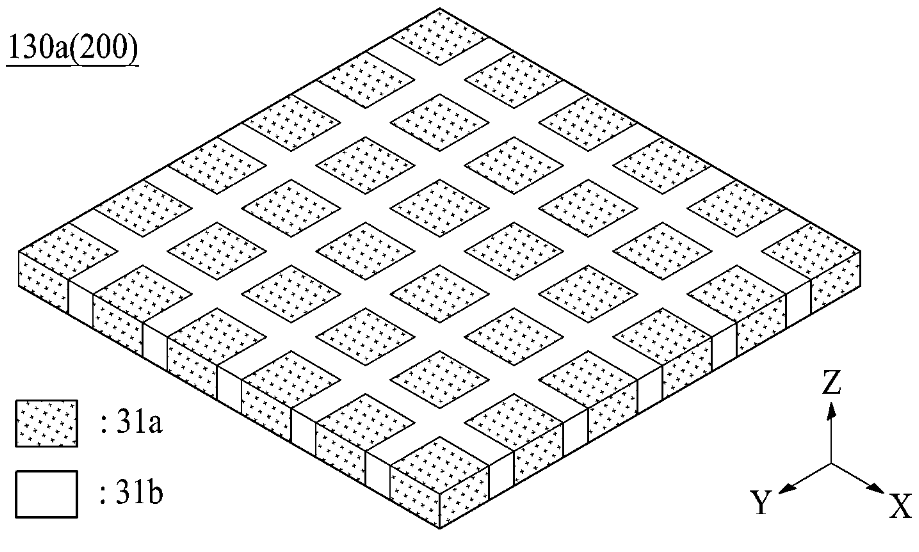

Referring to FIG. 4C, a vibration portion 130*a* according to another embodiment of the present disclosure may include a plurality of first portions 31*a* which are disposed apart from one another in a first direction X and a second direction Y and a second portion 31*b* disposed between the plurality of first portions 31*a*. The plurality of first portions 31*a* may be disposed apart from one another in each of the first direction X and the second direction Y. For example, the plurality of first portions 31*a* may have a hexahedral shape having the same size and may be arranged in a lattice shape. The second portion 31*b* may be disposed between the plurality of first portions 31*a* in each of the first direction X and the second direction Y. The second portion 31*b* may be configured to fill a gap between two adjacent first portions 31*a* or to surround each of the plurality of first portions 31*a*. Therefore, the second portion 31*b* may be connected to or attached on an adjacent first portion 31*a*. For example, a width of the second portion 31*b* disposed between two first portions 31*a* adjacent to each other in the first direction X may be the same as or different from that of the first portion 31*a*, and a width of a second portion 31*b* disposed between two first portions 31*a* adjacent to each other in the second direction Y may be the same as or different from that of the first portion 31*a*. Accordingly, the vibration portion 130*a* illustrated in FIG. 4C may have a resonance frequency of 30 MHz or less based on a 1-3 composite structure. However, the present disclosure is not limited thereto, and the resonance frequency of the vibration portion 130*a* may vary based on one or more of a shape, a length, and a thickness of the vibration portion.

Figure 4D:
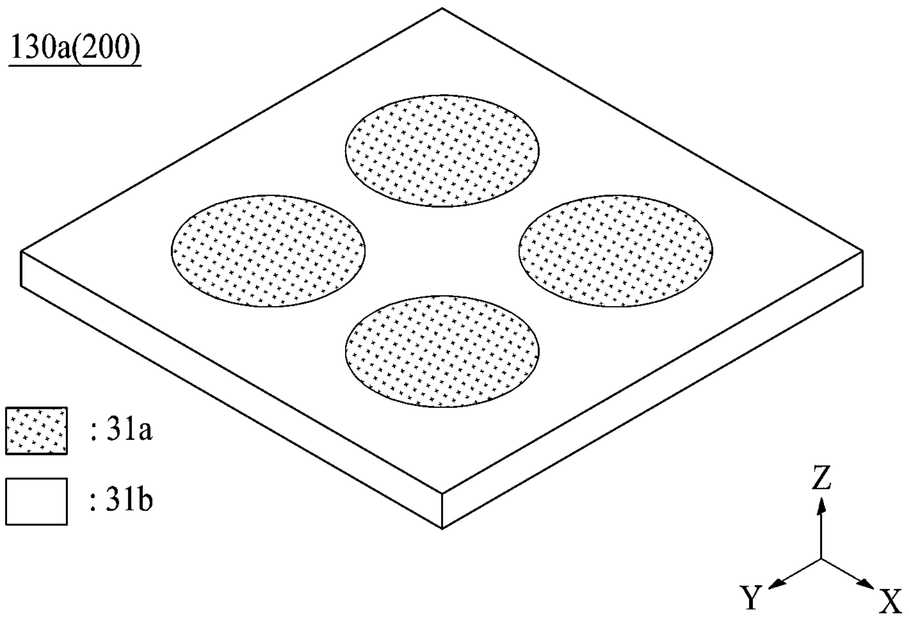

Referring to FIG. 4D, a vibration portion 130*a* according to another embodiment of the present disclosure may include a plurality of first portions 31*a* which are disposed apart from one another in a first direction X and a second direction Y and a second portion 31*b* which surrounds each of the plurality of first portions 31*a*. Each of the plurality of first portions 31*a* may have a planar structure having a circular shape. For example, each of the plurality of first portions 31*a* may have a circular plate shape, but is not limited thereto. For example, each of the plurality of first portions 31*a* may have a dot shape including an oval shape, a polygonal shape, or a donut shape. The second portion 31*b* may be configured to surround each of the plurality of first portions 31*a*. Therefore, the second portion 31*b* may be connected to or attached on a lateral surface of each of the plurality of first portions 31*a*. The plurality of first portions 31*a* and the second portion 31*b* may be disposed (or arranged) in parallel on the same plane (or the same layer). Accordingly, the vibration portion 130*a* illustrated in FIG. 4D may be implemented as a vibration source (or a vibration element) having a circular shape to have a 1-3 composite structure, and thus, may have a resonance frequency of 30 MHz or less, thereby enhancing a vibration characteristic or a sound output characteristic. However, the present disclosure is not limited thereto, and the resonance frequency of the vibration portion 130*a* may vary based on one or more of a shape, a length, and a thickness of the vibration portion.

Figure 4E:
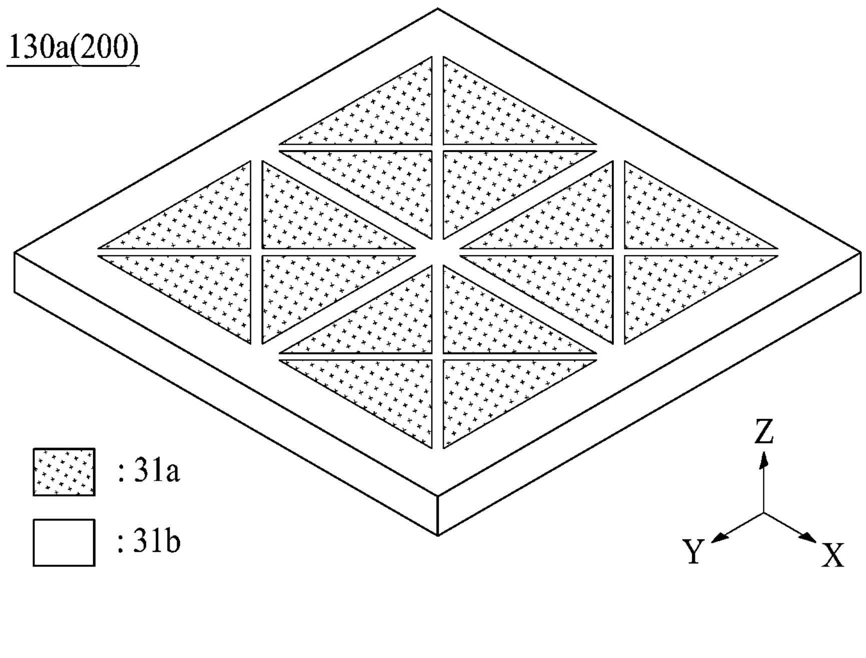

Referring to FIG. 4E, a vibration portion 130*a* according to another embodiment of the present disclosure may include a plurality of first portions 31*a* which are disposed apart from one another in a first direction X and a second direction Y and a second portion 31*b* which surrounds each of the plurality of first portions 31*a*. Each of the plurality of first portions 31*a* may have a planar structure having a triangular shape. For example, each of the plurality of first portions 31*a* may have a triangular plate shape.

For example, four adjacent first portions 31*a* of the plurality of first portions 31*a* may be disposed adjacent to one another to form a tetragonal shape (or a square shape). A vertex of each of four adjacent first portions 31*a* forming a tetragonal shape may be disposed adjacent to a middle portion (or a center portion) of a tetragonal shape. The second portion 31*b* may be configured to surround each of the plurality of first portions 31*a*. Therefore, the second portion 31*b* may be connected to or attached on a lateral surface of each of the plurality of first portions 31*a*. The plurality of first portions 31*a* and the second portion 31*b* may be disposed (or arranged) in parallel on the same plane (or the same layer). Accordingly, the vibration portion 130*a* illustrated in FIG. 4E may be implemented as a vibration source (or a vibration element) having a circular shape to have a 1-3 composite structure, and thus, may have a resonance frequency of 30 MHz or less, thereby enhancing a vibration characteristic or a sound output characteristic. However, the present disclosure is not limited thereto, and the resonance frequency of the vibration portion 130*a* may vary based on one or more of a shape, a length, and a thickness of the vibration portion.

Figure 4F:
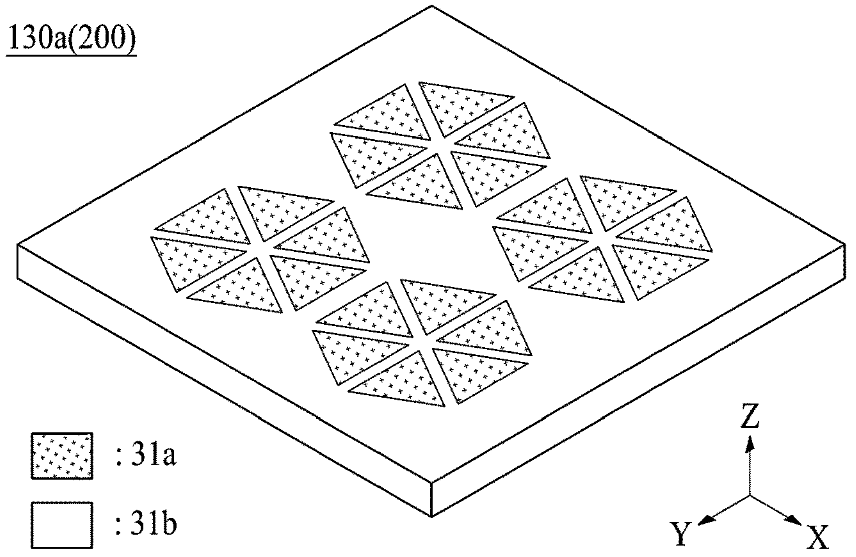

According to another embodiment of the present disclosure, as illustrated in FIG. 4F, six adjacent first portions 31*a* of the plurality of first portions 31*a* may be disposed adjacent to one another to form a hexagonal shape (or a regular hexagon). A vertex of each of six adjacent first portions 31*a* forming a hexagonal shape may be disposed adjacent to a middle portion (or a center portion) of a hexagonal shape. The second portion 31*b* may be configured to surround each of the plurality of first portions 31*a*. Therefore, the second portion 31*b* may be connected to or attached on a lateral surface of each of the plurality of first portions 31*a*. The plurality of first portions 31*a* and the second portion 31*b* may be disposed (or arranged) in parallel on the same plane (or the same layer). Accordingly, the vibration portion 130*a* illustrated in FIG. 4F may be implemented as a vibration source (or a vibration element) having a circular shape to have a 1-3 composite structure, and thus, may have a resonance frequency of 30 MHz or less, thereby enhancing a vibration characteristic or a sound output characteristic. However, the present disclosure is not limited thereto, and the resonance frequency of the vibration portion 130*a* may vary based on one or more of a shape, a length, and a thickness of the vibration portion.

Referring to FIGS. 4E and 4F, 2N (where N is a natural number of 2 or more) adjacent first portions 31*a* of a plurality of first portions 31*a* having a triangular shape may be arranged adjacent to one another to form a 2N-angular shape.

In FIGS. 4A to 4F, each of the plurality of first portions 31*a* according to an embodiment of the present disclosure may include an inorganic material portion. The inorganic material portion may include a piezoelectric material or an electro active material. The piezoelectric material or the electro active material may have a characteristic where pressure or twisting is applied to a crystalline structure by an external force, a potential difference occurs due to dielectric polarization caused by a relative position change of a positive (+) ion and a negative (−) ion, and a vibration is generated by an electric field based on a voltage applied thereto. Referring to FIG. 3, a first surface of each of the plurality of first portions 31*a* may be electrically connected to the first electrode portion 130*b*, and a second surface of each of the plurality of first portions 31*a* may be electrically connected to the second electrode portion 130*c*.

Figure 5:
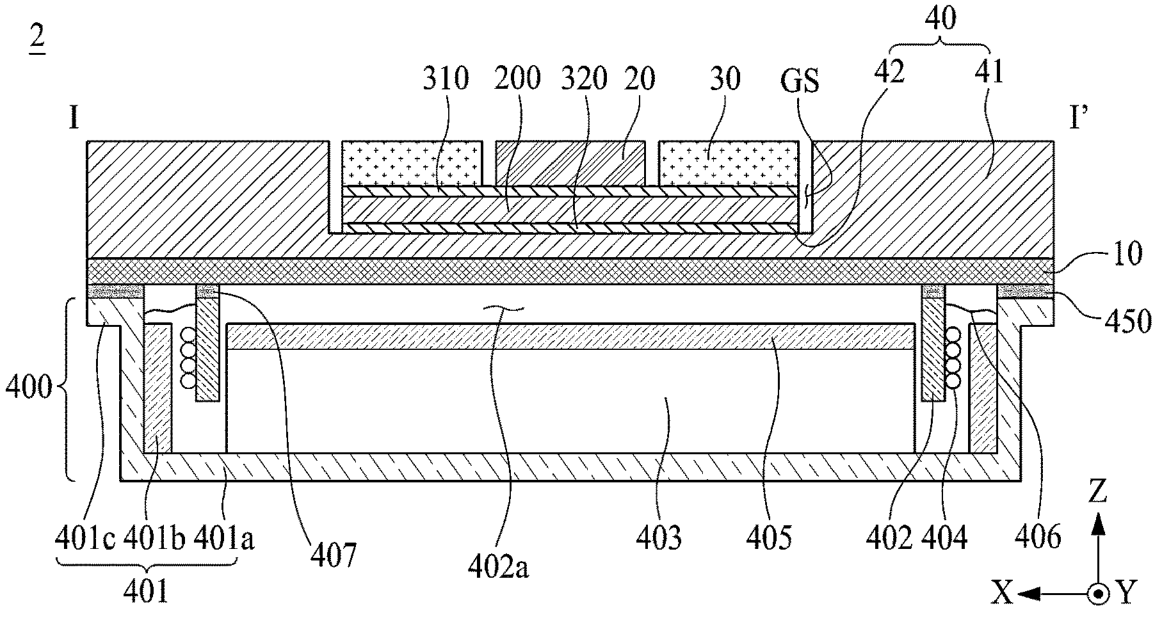
FIG. 5 is another cross-sectional view taken along line I-I' of FIG. 1.

FIG. 5 is another cross-sectional view taken along line I-I' of FIG. 1. In FIG. 5, the same elements as descriptions of FIGS. 1 and 2 are referred to by like reference numerals, and repeated descriptions thereof are omitted or will be briefly given below.

Referring to FIG. 5, a sound apparatus 2 according to another embodiment of the present disclosure may include a vibration apparatus and a vibration member.

According to another embodiment of the present disclosure, the vibration apparatus may include a first vibration apparatus 200 and a second vibration apparatus 400.

According to another embodiment of the present disclosure, the vibration member may include a first vibration member 20, a second vibration member 30, and a third vibration member 40.

For example, the second vibration member 30 may be at a periphery of the first vibration member 20. For example, the second vibration member 30 may be disposed apart from the first vibration member 20. For example, the second vibration member 30 may be disposed apart from the third vibration member 40 with a gap space interposed therebetween.

For example, the third vibration member 40 may be at a periphery of the second vibration member 30. The third vibration member 40 may be at a periphery of the first vibration member 20 and the second vibration member 30.

The third vibration member 40 may surround the first vibration member 20 and the second vibration member 30. The third vibration member 40 may include a protrusion portion 41 and a concave portion 42. For example, the first vibration member 20 and the second vibration member 30 may be disposed in the concave portion 42 of the third vibration member 40.

The second vibration member 30 may overlap the first vibration apparatus 200. For example, one side (or an end or a portion) of the second vibration member 30 may match one side (or an end or a portion) of the first vibration apparatus 200. Accordingly, a gap space GS may be provided between the second vibration member 30 and the third vibration member 40. The loss of a vibration of the first vibration apparatus 200 may be reduced or minimized by the gap space GS, and thus, a sound pressure level characteristic and/or a sound characteristic of a sound generated based on a vibration of the second vibration member 30 may increase.

According to another embodiment of the present disclosure, a modulus of the first adhesive member 310 and a modulus of the second adhesive member 320 may be differently configured and applied along with the embodiment described above with reference to FIGS. 1 and 2. For example, a modulus of the first adhesive member 310 may be greater than that of the second adhesive member 320. Accordingly, a vibration of the first vibration apparatus 200 and/or the second vibration apparatus 400 may be better transferred to one or more of the first to third vibration members 20 to 40, thereby providing an apparatus having a more enhanced sound characteristic and/or sound pressure level characteristic.

Figure 6:
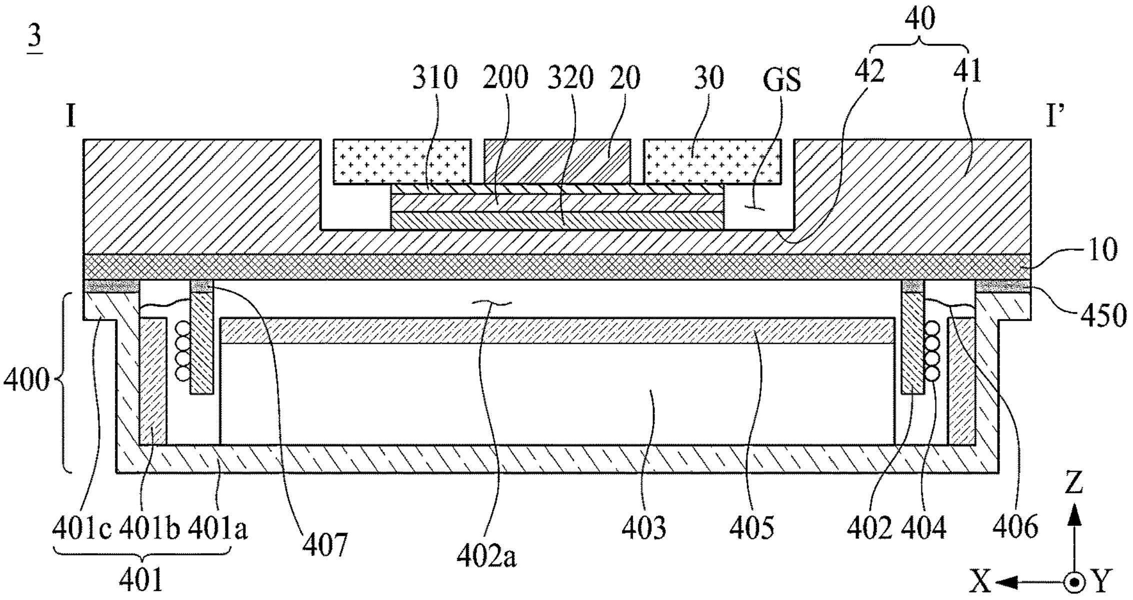
FIG. 6 is another cross-sectional view taken along line I-I' of FIG. 1.

FIG. 6 is another cross-sectional view taken along line I-I' of FIG. 1. In FIG. 6, the same elements as descriptions of FIGS. 1 and 2 are referred to by like reference numerals, and repeated descriptions thereof are omitted or will be briefly given below.

Referring to FIG. 6, a sound apparatus 3 according to another embodiment of the present disclosure may include a vibration apparatus and a vibration member.

According to another embodiment of the present disclosure, the vibration apparatus may include a first vibration apparatus 200 and a second vibration apparatus 400.

According to another embodiment of the present disclosure, the vibration member may include a first vibration member 20, a second vibration member 30, and a third vibration member 40.

For example, the second vibration member 30 may be at a periphery of the first vibration member 20. For example, the second vibration member 30 may be disposed apart from the first vibration member 20. For example, the second vibration member 30 may be disposed apart from the third vibration member 40 with a gap space interposed therebetween.

For example, the third vibration member 40 may be at a periphery of the second vibration member 30. The third vibration member 40 may be at a periphery of the first vibration member 20 and the second vibration member 30. The third vibration member 40 may surround the first vibration member 20 and the second vibration member 30. The third vibration member 40 may include a protrusion portion 41 and a concave portion 42. For example, the first vibration member 20 and the second vibration member 30 may be disposed in the concave portion 42 of the third vibration member 40.

The sound apparatus 3 according to another embodiment of the present disclosure may further include a first adhesive member 310 and a second adhesive member 320.

For example, the first adhesive member 310 may be disposed on a first surface of the first vibration apparatus 200. For example, the first adhesive member 310 may be disposed on a second surface, which is opposite to the first surface, of the first vibration apparatus 200.

For example, the first adhesive member 310 may be disposed between the first and second vibration members 20 and 30 and the first vibration apparatus 200. For example, the second adhesive member 320 may between the third vibration member 40 and the first vibration apparatus 200.

For example, one or more of the first and second adhesive members 310 and 320 may include an optically clear adhesive (OCA) and an optically clear resin (OCR), but embodiments of the present disclosure are not limited thereto. For example, the first adhesive member 310 may include an acrylic material, a silicone-based material, and a urethane-based material, but embodiments of the present disclosure are not limited thereto. For example, the second adhesive member 320 may include an acrylic material, a silicone-based material, and a urethane-based material, but embodiments of the present disclosure are not limited thereto.

A thickness of the first adhesive member 310 according to another embodiment of the present disclosure may be adjusted to be different from that of the second adhesive member 320. For example, a thickness of the second adhesive member 320 may be adjusted to be thicker than that of the first adhesive member 310. A thickness of the second adhesive member 320 may be 20 μm to 100 μm, but embodiments of the present disclosure are not limited thereto. A thickness of the first adhesive member 310 may be 10 μm to 30 μm, but embodiments of the present disclosure are not limited thereto. Therefore, the first adhesive member 310 having a thin thickness may transfer a vibration of the first vibration apparatus 200 to the first vibration member 20 and the second vibration member 30 without attenuation. The second adhesive member 320 having a thick thickness may isolate and damp a vibration generated in the third vibration member 40. Accordingly, the sound apparatus 3 according to another embodiment of the present disclosure may provide a sound apparatus having an enhanced sound characteristic and/or sound pressure level characteristic.

According to another embodiment of the present disclosure, a modulus of the first adhesive member 310 described above with reference to FIGS. 1 and 2 in conjunction with the embodiment of FIG. 6 may be adjusted to be different from that of the second adhesive member 320 and may be applied. For example, a modulus of the first adhesive member 310 may be greater than that of the second adhesive member 320. Accordingly, a vibration of the first vibration apparatus 200 and/or the second vibration apparatus 400 may be better transferred to one or more of the first to third vibration members 20 to 40, thereby providing an apparatus having a more enhanced sound characteristic and/or sound pressure level characteristic.

According to another embodiment of the present disclosure, a sound apparatus may be applied where one side (or an end or a portion) of the second vibration member 30 described above with reference to FIG. 5 in conjunction with the embodiment of FIG. 6 matches one side (or an end or a portion) of the first vibration apparatus 200. Accordingly, a gap space GS may be provided between the second vibration member 30 and the third vibration member 40. The loss of a vibration of the first vibration apparatus 200 may be reduced or minimized by the gap space GS, and thus, a sound pressure level characteristic and/or a sound characteristic of a sound generated based on a vibration of the second vibration member 30 may increase.

Figure 7:
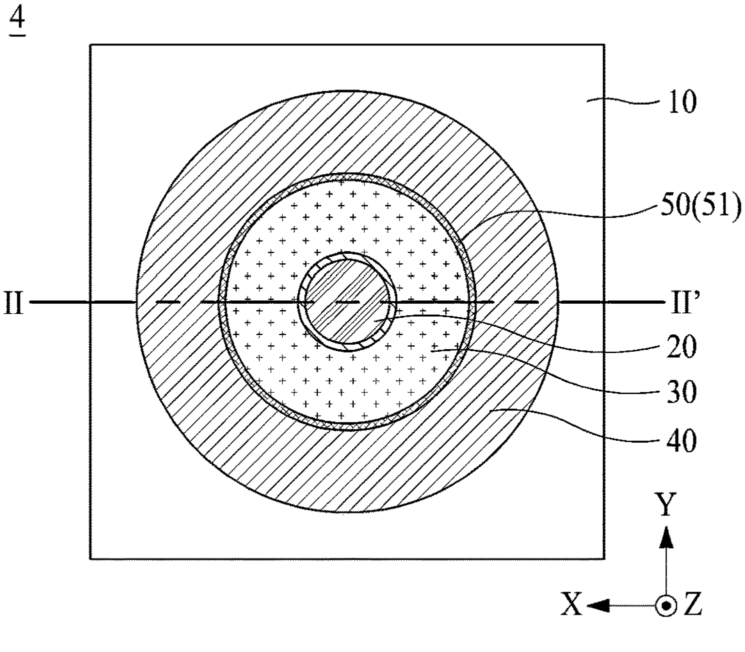
FIG. 7 illustrates a sound apparatus according to another embodiment of the present disclosure.
Figure 8:
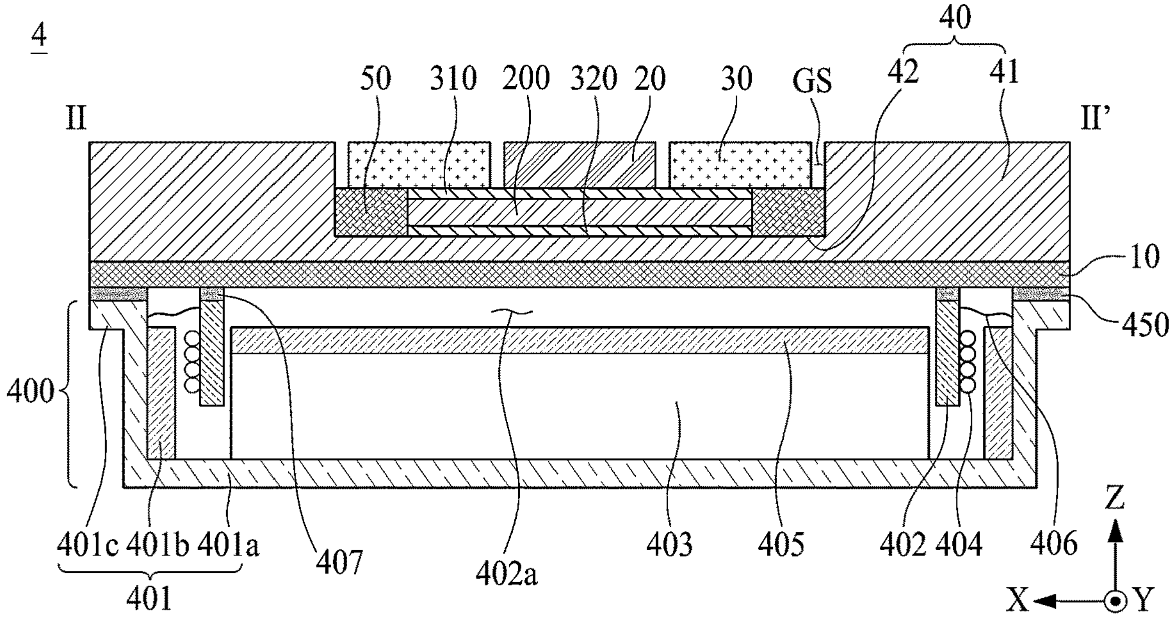
FIG. 8 is a cross-sectional view taken along line II-II' of FIG. 7.
Figure 9:
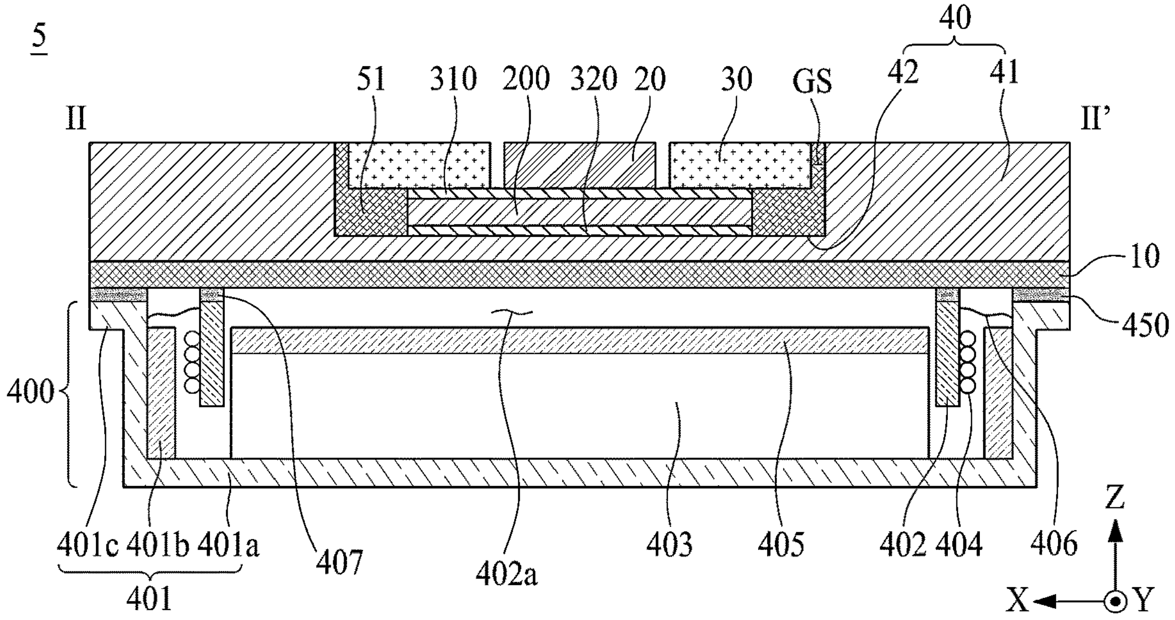
FIG. 9 is another cross-sectional view taken along line II-IP of FIG. 7.

FIG. 7 is illustrates a sound apparatus according to another embodiment of the present disclosure. FIG. 8 is a cross-sectional view taken along line II-IF of FIG. 7. FIG. 9 is another cross-sectional view taken along line II-IF of FIG. 7. In FIGS. 7 to 9, the same elements as descriptions of FIGS. 1 and 2 are referred to by like reference numerals, and repeated descriptions thereof are omitted or will be briefly given below.

Referring to FIGS. 7 to 9, a sound apparatus 4 according to another embodiment of the present disclosure may include a vibration apparatus and a vibration member.

According to another embodiment of the present disclosure, the vibration apparatus may include a first vibration apparatus 200 and a second vibration apparatus 400.

According to another embodiment of the present disclosure, the vibration member may include a first vibration member 20, a second vibration member 30, and a third vibration member 40.

For example, the second vibration member 30 may be at a periphery of the first vibration member 20. For example, the second vibration member 30 may be disposed apart from the first vibration member 20. For example, the second vibration member 30 may be disposed apart from the third vibration member 40 with a gap space interposed therebetween.

For example, the third vibration member 40 may be at a periphery of the second vibration member 30. The third vibration member 40 may be at a periphery of the first vibration member 20 and the second vibration member 30. The third vibration member 40 may surround the first vibration member 20 and the second vibration member 30. The third vibration member 40 may include a protrusion portion 41 and a concave portion 42. The concave portion may contact the first vibration apparatus 200. For example, the first vibration member 20 and the second vibration member 30 may be disposed in the concave portion 42 of the third vibration member 40.

The sound apparatus 4 according to another embodiment of the present disclosure may further include a fourth vibration member 50. The fourth vibration member 50 may be between the second vibration member 30 and the third vibration member 40. For example, the fourth vibration member 50 may fill a region between the second vibration member 30 and the third vibration member 40. The fourth vibration member 50 may include the same material as that of one or more of the second vibration member 30 and the third vibration member 40. For example, the fourth vibration member 50 may include one or more of paper, synthetic resin, and metal.

For example, the second vibration member 30 may be disposed to protrude to the third vibration member 40. For example, the second vibration member 30 may be disposed to protrude to an outer portion of the first vibration apparatus 200. Therefore, a gap space GS may be formed between the first vibration apparatus 200 and the third vibration member 40. For example, the gap space GS may be provided between the concave portion 42 of the third vibration member 40 and/or the second vibration member 30. The fourth vibration member 50 may fill the gap space GS. For example, the fourth vibration member 50 may fill a portion of the gap space GS. The fourth vibration member 50 may be disposed in a space between the second vibration member 30 and the third vibration member 40.

The fourth vibration member 50 may be implemented in a horn form where the second vibration member 30 protrudes to an outer portion of the first vibration apparatus 200 and is surrounded by the third vibration member 40. Flow of air may occur in a horn-shape space and may act as a waveguide so that a sound generated in the third vibration member 40 is more sufficient. The fourth vibration member 50 may output a sound of a low-pitched sound band. Accordingly, because the fourth vibration member 50 is configured, a sound of the low-pitched sound band of the third vibration member 40 may increase, and a sound of the low-pitched sound band of the first vibration apparatus 200 may be complemented. For example, the fourth vibration member 50 may be a vibration plate or an active vibration member, but embodiments of the present disclosure are not limited thereto.

Referring to FIG. 9, the fourth vibration member 51 according to another embodiment of the present disclosure may fill a region between the second vibration member 30 and the third vibration member 40. The fourth vibration member 51 may fill the gap space GS. For example, the fourth vibration member 51 may fill all of the gap space GS. The fourth vibration member 51 may be implemented in a horn form where the second vibration member 30 protrudes to an outer portion of the first vibration apparatus 200 and is surrounded by the third vibration member 40. Flow of air may occur in a horn-shape space and may act as a waveguide so that a sound generated in the third vibration member 40 is more sufficient. FIG. 9 may output a sound which is more sufficient than FIG. 8. Accordingly, because the fourth vibration member 51 is configured, a sound of the low-pitched sound band of the third vibration member 40 may increase, and a sound of the low-pitched sound band of the first vibration apparatus 200 may be complemented.

According to another embodiment of the present disclosure, a modulus of the first adhesive member 310 described above with reference to FIG. 1 in conjunction with the embodiments of FIGS. 7 to 9 may be adjusted to be different from that of the second adhesive member 320. For example, a modulus of the first adhesive member 310 may be greater than that of the second adhesive member 320. Accordingly, a vibration of the first vibration apparatus 200 and/or the second vibration apparatus 400 may be better transferred to one or more of the first to fourth vibration members 20 to 50, thereby providing an apparatus having a more enhanced sound characteristic and/or sound pressure level characteristic.

According to another embodiment of the present disclosure, a sound apparatus may be applied where one side (or an end or a portion) of the second vibration member 30 described above with reference to FIG. 5 in conjunction with the embodiment of FIG. 6 matches one side (or an end or a portion) of the first vibration apparatus 200. Accordingly, a gap space GS may be provided between the second vibration member 30 and the third vibration member 40. The loss of a vibration of the first vibration apparatus 200 may be reduced or minimized by the gap space GS, and thus, a sound pressure level characteristic and/or a sound characteristic of a sound generated based on a vibration of the second vibration member 30 may increase.

According to another embodiment of the present disclosure, a thickness of the first adhesive member 310 described above with reference to FIG. 6 in conjunction with the embodiments of FIGS. 7 to 9 may be adjusted to be different from that of the second adhesive member 320. For example, a thickness of the second adhesive member 320 may be thicker than that of the first adhesive member 310. Accordingly, a vibration of the first vibration apparatus 200 and/or the second vibration apparatus 400 may be better transferred to one or more of the first to fourth vibration members 20 to 50, thereby providing an apparatus having a more enhanced sound characteristic and/or sound pressure level characteristic.

According to another embodiment of the present disclosure, a modulus and/or a thickness of each of the first and second adhesive members 310 and 320 described above with reference to FIGS. 1 and 6 in conjunction with the embodiments of FIGS. 7 to 9 may be applied. Accordingly, a vibration of the first vibration apparatus 200 and/or the second vibration apparatus 400 may be better transferred to one or more of the first to fourth vibration members 20 to 50, thereby providing an apparatus having a more enhanced sound characteristic and/or sound pressure level characteristic.

Figure 10:
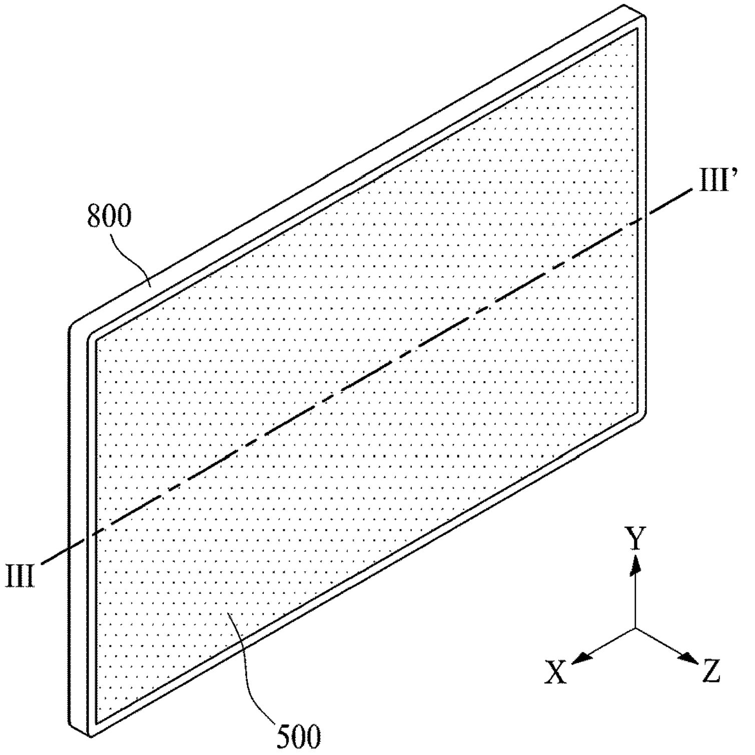
FIG. 10 illustrates an apparatus according to an embodiment of the present disclosure.
Figure 11:
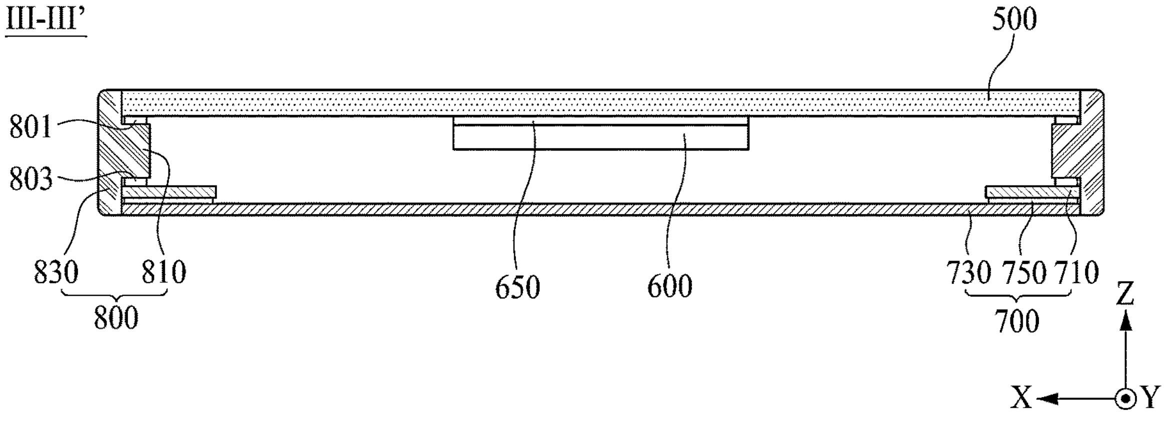
FIG. 11 is a cross-sectional view taken along line of FIG. 10.

FIG. 10 illustrates an apparatus according to an embodiment of the present disclosure. FIG. 11 is a cross-sectional view taken along line of FIG. 10.

Referring to FIGS. 10 and 11, the apparatus according to an embodiment of the present disclosure may include a passive vibration member 500 and a vibration generating apparatus 600.

For example, the passive vibration member 500 may output a sound based on a vibration of the vibration generating apparatus 600. The vibration generating apparatus 600 may output a sound by using the passive vibration member 500 as a vibration plate. For example, the vibration generating apparatus 600 may output a sound toward a front surface of the passive vibration member 500 by using the passive vibration member 500 as a vibration plate. For example, the vibration generating apparatus 600 may generate a sound so that the sound travels toward the front surface of the passive vibration member 500. The vibration generating apparatus 600 may vibrate the passive vibration member 500 to output a sound. For example, the vibration generating apparatus 600 may directly vibrate the passive vibration member 500 to output a sound. The vibration generating apparatus 600 may include one or more of the sound apparatuses 1 to 5 described above with reference to FIGS. 1 to 9. For example, the vibration generating apparatus 600 may be configured in a coupling structure of two or more of the sound apparatuses 1 to 5 described above with reference to FIGS. 1 to 9. For example, the coupling structure may be one of a coupling structure of the sound apparatus 1 and the sound apparatus 3, a coupling structure of the sound apparatus 1, the sound apparatus 3, and the sound apparatus 4, a coupling structure of the sound apparatus 1, the sound apparatus 3, and the sound apparatus 5, a coupling structure of the sound apparatus 2 and the sound apparatus 3, a coupling structure of the sound apparatus 2 and the sound apparatus 4, and a coupling structure of the sound apparatus 2 and the sound apparatus 5. The vibration generating apparatus 600 may be a sound apparatus, a vibrator, or a vibration generator, but the terms are not limited thereto. For example, the passive vibration member 500 may be a vibration object, a display panel, a vibration plate, or a front member, but embodiments of the present disclosure are not limited thereto. Hereinafter, an embodiment where the passive vibration member 500 is a display panel will be described.

The vibration generating apparatus 600 according to the present disclosure may be applied to a display apparatus. For example, examples of the display apparatus may include a display apparatus such as an organic light emitting display (OLED) module or a liquid crystal module (LCM) including a display panel and a driver for driving the display panel. Also, examples of the display apparatus may include a set device (or a set apparatus) or a set electronic device such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Therefore, in the present disclosure, examples of the display apparatus may include a display apparatus itself, such as an LCM or an OLED module, and a set device which is a final consumer device or an application product including the LCM or the OLED module.

In some embodiments, an LCM or an OLED module including a display panel and a driver may be referred to as a display apparatus, and an electronic device which is a final product including an LCM or an OLED module may be referred to as a set device. For example, the display apparatus may include a display panel, such as an LCD or an OLED, and a source printed circuit board (PCB) which is a controller for driving the display panel. The set device may further include a set PCB which is a set controller electrically connected to the source PCB to overall control the set device.

A display panel applied to an embodiment of the present disclosure may use all types of display panels such as a liquid crystal display panel, an organic light emitting diode (OLED) display panel, and an electroluminescent display panel, but is not limited to a specific display panel which is vibrated by a sound generating apparatus according to an embodiment of the present disclosure to output a sound. Also, a shape or a size of a display panel applied to a display apparatus according to an embodiment of the present disclosure is not limited.

The display panel may further include a backing such as a metal plate attached on the display panel. However, the present embodiment is not limited to the metal plate, and the display panel may include another structure (for example, another structure including another material).

The display panel may display an image (for example, an electronic image, a digital image, a still image, or a video image). The display panel may be a curved display panel or all types of display panels such as a liquid crystal display panel, an organic light emitting display panel, a quantum dot light emitting display panel, a micro light emitting diode display panel, and an electrophoresis display panel. The display panel may be a flexible display panel. For example, the display panel may be a flexible light emitting display panel, a flexible electrophoresis display panel, a flexible electro-wetting display panel, a flexible micro light emitting diode display panel, or a flexible quantum dot light emitting display panel.

A display panel according to an embodiment of the present disclosure may include a display area which displays an image based on driving of a plurality of pixels. The display panel may include the display area and a non-display area which surrounds the display area, but embodiments of the present disclosure are not limited thereto.

When the display panel is an organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another example, the layer provided on the array substrate may include a micro light emitting diode.

The display panel according to an embodiment of the present disclosure may include an anode electrode, a cathode electrode, and a light emitting device and may display an image in a type such as a top emission type, a bottom emission type, or a dual emission type, based on a structure of a pixel array layer including a plurality of pixels. In the top emission type, visible light emitted from the pixel array layer may be irradiated a forward direction of a base substrate to allow an image to be displayed, and in the bottom emission type, the visible light emitted from the pixel array layer may be irradiated in a rearward direction of the base substrate to allow an image to be displayed.

The display panel according to an embodiment of the present disclosure may include a pixel array portion disposed on a substrate. The pixel array portion may include a plurality of pixels which display an image based on a signal supplied through each of signal lines. The signal lines may include a gate line, a data line, and a pixel driving power line, but embodiments of the present disclosure are not limited thereto.

Each of the plurality of pixels may include a pixel circuit layer including a driving TFT disposed in a pixel area which is configured by a plurality of gate lines and/or a plurality of data lines, an anode electrode electrically connected to the driving TFT, a light emitting device layer formed on the anode electrode, and a cathode electrode electrically connected to the light emitting device layer.

The driving TFT may be provided in a transistor region of each pixel area provided in a substrate. The driving TFT may include a gate electrode, a gate insulation layer, a semiconductor layer, a source electrode, and a drain electrode. The semiconductor layer of the driving TFT may include silicon such as amorphous silicon (a-Si), polysilicon (poly-Si), or low temperature poly-Si or may include oxide such as indium-gallium-zinc-oxide (IGZO), but embodiments of the present disclosure are not limited thereto.

The anode electrode (or a pixel electrode) may be provided in an opening region provided in each pixel area and may be electrically connected to the driving TFT.

The light emitting device according to an embodiment of the present disclosure may include an organic light emitting device layer provided on the anode electrode. The organic light emitting device layer may be implemented so that pixels emit light of the same color (for example, white light) or emit lights of different colors (for example, red light, green light, and blue light). The cathode electrode (or a common electrode) may be connected to the organic light emitting device layer provided in each pixel area. For example, the organic light emitting device layer may have a stack structure including two or more structures or a single structure including the same color. In another embodiment of the present disclosure, the organic light emitting device layer may have a stack structure including two or more structures including one or more different colors for each pixel. Two or more structures including one or more different colors may be configured in one or more of blue, red, yellow-green, and green, or a combination thereof, but embodiments of the present disclosure are not limited thereto. An example of the combination may include blue and red, red and yellow-green, red and green, and red/yellow-green/green, but embodiments of the present disclosure are not limited thereto. Also, regardless of a stack order thereof, the combination may be applied. A stack structure including two or more structures having the same color or one or more different colors may further include a charge generating layer between two or more structures. The charge generating layer may have a PN junction structure and may include an N-type charge generating layer and a P-type charge generating layer.

According to another embodiment of the present disclosure, the light emitting device layer may include a micro light emitting diode device which is electrically connected to each of the anode electrode and the cathode electrode. The micro light emitting diode device may be a light emitting diode implemented as an integrated circuit (IC) type or a chip type. The micro light emitting diode device may include a first terminal electrically connected to the anode electrode and a second terminal electrically connected to the cathode electrode. The cathode electrode may be connected to the second terminal of the micro light emitting diode device provided in each pixel area.

An encapsulation portion may be formed on the substrate to surround the pixel array portion, and thus, may prevent oxygen or water from penetrating into the light emitting device layer of the pixel array portion. The encapsulation portion according to an embodiment of the present disclosure may be formed in a multi-layer structure where an organic material layer and an inorganic material layer are alternately stacked, but embodiments of the present disclosure are not limited thereto. The inorganic material layer may prevent oxygen or water from penetrating into the light emitting device layer of the pixel array portion. The organic material layer may be formed to have a thickness which is relatively thicker than that of the inorganic material layer, so as to cover particles occurring in a manufacturing process. For example, the encapsulation portion may include a first inorganic layer, an organic layer on the first inorganic layer, and a second inorganic layer on the organic layer. The organic layer may be a particle covering layer, but the terms are not limited thereto. A touch panel may be disposed on the encapsulation portion, or may be disposed on a rear surface of the pixel array portion or in the pixel array portion.

The display panel according to an embodiment of the present disclosure may include a first substrate, a second substrate, and a liquid crystal layer. The first substrate may be an upper substrate or a TFT array substrate. For example, the display panel may include the first substrate including a TFT which is a switching element for adjusting a light transmittance of each pixel, the second substrate including a color filter and/or a black matrix, and the liquid crystal layer formed between the first substrate and the second substrate. For example, the first substrate may include a pixel array (or a display portion or a display area) including a plurality of pixels provided in a pixel area configured by the plurality of gate lines and/or the plurality of data lines. Each of the plurality of pixels may include a TFT connected to a gate line and/or a data line, a pixel electrode connected to the TFT, and a common electrode which is formed to be adjacent to the pixel electrode and is supplied with a common voltage.

The first substrate may further include a pad portion provided at a first edge (or a non-display portion or a first periphery) thereof and a gate driving circuit provided at a second edge (or a second non-display portion or a second periphery) thereof.

The pad portion may supply the pixel array portion and/or the gate driving circuit with a signal supplied from the outside. For example, the pad portion may include a plurality of data pads connected to the plurality of data lines through a plurality of data link lines and/or a plurality of gate input pads connected to the gate driving circuit through a gate control signal line. For example, a size of the first substrate may be greater than that of the second substrate, but the terms are not limited thereto.

The gate driving circuit may be embedded (or integrated) into the second edge (or the second periphery) of the first substrate so as to be connected to the plurality of gate lines. For example, the gate driving circuit may be implemented with a shift register including a transistor formed by the same process as a TFT provided in the pixel area. According to another embodiment of the present disclosure, the gate driving circuit may not be embedded into the first substrate and may be provided in a panel driving circuit in an IC type.

The second substrate may be a lower substrate or a color filter array substrate. For example, the second substrate may include a pixel pattern (or a pixel definition pattern) capable of including an opening region overlapping the pixel area formed in the first substrate and a color filter layer formed in the opening region. The second substrate may have a size which is less than that of the first substrate, but embodiments of the present disclosure are not limited thereto. The second substrate may overlap the other portion, except the first edge (or the first periphery), of the first substrate. The second substrate may be bonded or attached to the other portion, except the first edge (or the first periphery), of the first substrate by a sealant with the liquid crystal layer therebetween.

The liquid crystal layer may be disposed between the first substrate and the second substrate. The liquid crystal layer may include liquid crystal where an alignment direction of liquid crystal molecules is changed based on an electrical field generated by the common voltage and a data voltage applied to the pixel electrode for each pixel.

A second polarization member may be attached on a bottom surface of the second substrate and may polarize light which is incident from a backlight and travels to the liquid crystal layer. The first polarization member may be attached on a top surface of the first substrate and may polarize light which passes through the first substrate and is discharged to the outside.

The display panel according to an embodiment of the present disclosure may drive the liquid crystal layer with the electrical field which is generated by the common voltage and the data voltage applied to each pixel, thereby displaying an image based on light passing through the liquid crystal layer.

In a display panel according to another embodiment of the present disclosure, the first substrate may be a color filter array substrate, and the second substrate may be a TFT array substrate. For example, the display panel according to another embodiment of the present disclosure may have a form where the display panel according to an embodiment of the present disclosure is vertically reversed. In this case, a pad portion of the display panel according to another embodiment of the present disclosure may be covered by a separate mechanism.

The display panel according to another embodiment of the present disclosure may include a bending portion which is bent or curved to have a certain curvature radius or a curved shape.

The bending portion of the display panel may be implemented at one or more of one edge portion (or one periphery portion) and the other edge portion (or the other periphery portion) of the display panel parallel to each other. The one edge portion and the other edge portion of the display panel implementing the bending portion may include only a non-display area, or may include an edge portion of the display area and the non-display area. A display panel including a bending portion implemented by bending of a non-display area IA may have a one-side bezel bending structure or a both-side bezel bending structure. Also, a display panel including the edge portion (or the periphery portion) of the display area and the bending portion implemented by bending of the non-display area may have a one-side active bending structure or a both-side active bending structure.

The vibration generating apparatus 600 may vibrate the display panel at a rear surface of the display panel, and thus, may provide a user with a sound based on a vibration of the display panel. The vibration generating apparatus 600 may be implemented in the rear surface of the display panel to directly vibrate the display panel.

In an embodiment of the present disclosure, the vibration generating apparatus 600 may vibrate based on a vibration driving signal synchronized with an image displayed by the display panel to vibrate the display panel.

The vibration generating apparatus 600 may vibrate the display panel or the passive vibration member 500. For example, the vibration generating apparatus 600 may be implemented in a rear surface of the passive vibration member 500 to directly vibrate the display panel or the passive vibration member 500. For example, the vibration generating apparatus 600 may vibrate the passive vibration member 500 at the rear surface of the display panel or the passive vibration member 500, and thus, may provide a user with a full-range sound based on a vibration of the display panel or the passive vibration member 500.

According to another embodiment of the present disclosure, the vibration generating apparatus 600 may not be disposed in the rear surface of the display panel and may be applied to a non-display panel instead of the display panel. For example, the non-display panel may be one or more of metal, wood, plastic, glass, cloth, fiber, rubber, paper, leather, an interior material of a vehicle, an indoor ceiling of a building, and an interior material of an aircraft, but embodiments of the present disclosure are not limited thereto. In this case, the non-display panel may be applied as a vibration plate, and the vibration generating apparatus 600 may vibrate the non-display panel to output a sound.

For example, an apparatus according to an embodiment of the present disclosure may include a passive vibration member (or a vibration object) and the vibration generating apparatus 600 disposed in the passive vibration member. For example, the passive vibration member may include a display panel including a pixel configured to display an image, or may include a non-display panel. For example, the passive vibration member may include a display panel including a pixel configured to display an image, or may be one or more of wood, plastic, glass, metal, cloth, fiber, rubber, paper, leather, mirror, an interior material of a vehicle, a glass window of a vehicle, an indoor ceiling of a building, a glass window of a building, an interior material of a building, an interior material of an aircraft, and a glass window of an aircraft, but embodiments of the present disclosure are not limited thereto. For example, the passive vibration member may include one or more of a display panel including a pixel configured to display an image, a screen panel on which an image is to be projected from a display apparatus, a lighting panel, a signage panel, a vehicular interior material, a vehicular glass window, a vehicular exterior material, a ceiling material of a building, an interior material of a building, a glass window of a building, an interior material of an aircraft, a glass window of an aircraft, and mirror, but embodiments of the present disclosure are not limited thereto. For example, the non-display panel may be a light emitting diode lighting panel (or apparatus), an organic light emitting diode lighting panel (or apparatus), or an inorganic light emitting diode lighting panel (or apparatus), but embodiments of the present disclosure are not limited thereto. For example, the passive vibration member may include a display panel including a pixel configured to display an image, or may be one or more of a light emitting diode lighting panel (or apparatus), an organic light emitting diode lighting panel (or apparatus), or an inorganic light emitting diode lighting panel (or apparatus), but embodiments of the present disclosure are not limited thereto.

According to another embodiment of the present disclosure, the passive vibration member may include a plate. The plate may include a metal material, or may include a single nonmetal material or a complex nonmetal material including one or more of metal, wood, plastic, glass, cloth, fiber, rubber, paper, mirror, and leather, but embodiments of the present disclosure are not limited thereto. According to another embodiment of the present disclosure, the passive vibration member may include a plate. The plate may include one or more of metal, wood, plastic, glass, cloth, fiber, rubber, paper, mirror, and leather, but embodiments of the present disclosure are not limited thereto. For example, the paper may be a cone paper for speakers. For example, the cone paper may be pulp or foam plastic, but embodiments of the present disclosure are not limited thereto. For example, the passive vibration member may be a vibration object, a vibration plate, or a front member, but embodiments of the present disclosure are not limited thereto.

The vibration generating apparatus 600 may be disposed in the rear surface of the display panel 500 to overlap the display area of the display panel 500 (or the passive vibration member). For example, the vibration generating apparatus 600 may overlap a display area, corresponding to half or more, of the display area of the display panel 500. According to another embodiment of the present disclosure, the vibration generating apparatus 600 may overlap the whole display area of the display panel 500.

The apparatus according to an embodiment of the present disclosure may further include a connection member 650 (or a first connection member) between the vibration generating apparatus 600 and the display panel or the passive vibration member 500.

For example, the connection member 650 may be disposed between the vibration generating apparatus 600 and the rear surface of the display panel or the passive vibration member 500, and thus, may connect or couple the vibration generating apparatus 600 to the rear surface of the passive vibration member 500. For example, the vibration generating apparatus 600 may be connected or coupled to the rear surface of the display panel or the passive vibration member 500 by using the connection member 650, and thus, may be supported by or disposed in the rear surface of the display panel or the passive vibration member 500. For example, the vibration generating apparatus 600 may be disposed in the rear surface of the display panel or the passive vibration member 500 by using the connection member 650.

The connection member 650 according to an embodiment of the present disclosure may include a material including an adhesive layer which is good in adhesive force or attaching force with respect to each of the rear surface of the display panel or the passive vibration member 500 and the vibration generating apparatus 600. For example, the connection member 650 may include a foam pad, a double-sided tape, or an adhesive, but is not limited thereto. For example, the adhesive layer of the connection member 650 may include epoxy, acryl, silicone, or urethane, but embodiments of the present disclosure are not limited thereto. For example, the adhesive layer of the connection member 650 may include an acryl-based material, having a characteristic where an adhesive force is relatively good and hardness is high, among acryl and urethane. Accordingly, a vibration of the vibration generating apparatus 600 may be well transferred to the passive vibration member 500.

The adhesive layer of the connection member 650 may further include an additive such as a tackifier, a wax component, or an anti-oxidation agent, but embodiments of the present disclosure are not limited thereto. The additive may prevent the connection member 650 from being detached (stripped) from the display panel or the passive vibration member 500 by a vibration of the vibration generating apparatus 600. For example, the tackifier may be rosin derivative, the wax component may be paraffin wax, and the anti-oxidation agent may be a phenol-based anti-oxidation agent such as thioester, but embodiments of the present disclosure are not limited thereto.

According to another embodiment of the present disclosure, the connection member 650 may further include a hollow portion provided between the vibration generating apparatus 600 and the display panel or the passive vibration member 500. The hollow portion of the connection member 650 may provide an air gap between the vibration generating apparatus 600 and the display panel or the passive vibration member 500. Based on the air gap, a sound wave (or a sound pressure level) based on a vibration of the vibration generating apparatus 600 may not be dispersed by the connection member 650 and may concentrate on the display panel or the passive vibration member 500, and thus, the loss of a vibration based on the connection member 650 may be reduced or minimized, thereby increasing a sound pressure level characteristic and/or a sound characteristic of a sound generated based on a vibration of the display panel or the passive vibration member 500.

The apparatus according to an embodiment of the present disclosure may further include a supporting member 700 which is disposed on the rear surface (or a backside surface) of the passive vibration member 500.

The supporting member 700 may be disposed on the rear surface of the passive vibration member 500 or the display panel. For example, the supporting member 700 may cover the rear surface of the passive vibration member 500 or the display panel. For example, the supporting member 700 may include one or more of a glass material, a metal material, and a plastic material. Fox example, the supporting member 700 may be a rear structure, a set structure, a supporting structure, a supporting cover, a rear member, a case, or a housing, but the terms are not limited thereto. The supporting member 700 may be referred to as the other term such as a cover bottom, a plate bottom, a back cover, a base frame, a metal frame, a metal chassis, a chassis base, or an m-chassis. For example, the supporting member 700 may be a supporter which supports the display panel and may be implemented as an arbitrary type frame or a plate structure disposed on the rear surface of the passive vibration member 500.

An edge (or a periphery) or a sharp corner portion of the supporting member 700 may have an inclined shape or a curved shape through a chamfer process or a corner rounding process. For example, the glass material of the supporting member 700 may be sapphire glass. In another embodiment of the present disclosure, the supporting member 700 including the metal material may include one or more materials of aluminum (Al), an Al alloy, a magnesium (Mg) alloy, and an iron (Fe)-nickel (Ni) alloy.

The supporting member 700 according to an embodiment of the present disclosure may include a first supporting member 710 and a second supporting member 730.

The first supporting member 710 may cover the rear surface of the display panel 500. For example, the first supporting member 710 may be a plate member which covers the whole rear surface of the display panel 500. For example, the first supporting member 710 may be an inner plate including one or more materials of a glass material, a metal material, and a plastic material.

The first supporting member 710 may be disposed apart from a rearmost surface of the display panel 500 or the vibration generating apparatus 600 with a gap space therebetween. For example, the gap space may be referred to as an air gap, a vibration space, and a sound sounding box, but the terms are not limited thereto.

The second supporting member 730 may be disposed on a rear surface of the first supporting member 710. The second supporting member 730 may be a plate member which covers the whole rear surface of the first supporting member 710. For example, the second supporting member 730 may include one or more materials of a glass material, a metal material, and a plastic material. For example, the second supporting member 730 may be an outer plate, a rear plate, a back plate, a back cover, or a rear cover, but the terms are not limited thereto.

The supporting member 700 according to an embodiment of the present disclosure may further include a coupling member 750 (or a second connection member).

The coupling member 750 may be disposed between the first supporting member 710 and the second supporting member 730. For example, the first supporting member 710 may be coupled or connected to the second supporting member 730 by using a coupling member 750. For example, the coupling member 750 may be an adhesive resin, a double-sided tape, a double-sided foam tape, a double-sided foam pad, or a double-sided adhesive foam pad, but embodiments of the present disclosure are not limited thereto. For example, the coupling member 750 may have elasticity for impact absorption, but embodiments of the present disclosure are not limited thereto. For example, the coupling member 750 may be disposed in a whole region between the first supporting member 710 and the second supporting member 730. As another example, the coupling member 750 may be formed in a mesh structure including an air gap between the first supporting member 710 and the second supporting member 730.

The apparatus according to an embodiment of the present disclosure may further include a middle frame 800. The middle frame 800 may be disposed between a rear edge (or a rear periphery) of the display panel 500 (or the passive vibration member) and a front edge portion (or a front periphery portion) of the supporting member 700. The middle frame 800 may support one or more of an edge portion (or a periphery portion) of the display panel 500 and an edge portion (or a periphery portion) of the supporting member 700. The middle frame 800 may surround one or more of lateral surfaces of each of the display panel 500 and the supporting member 700. The middle frame 800 may provide an air space between the display panel 500 and the supporting member 700. The middle frame 800 may be referred to as a middle cabinet, a middle cover, a middle chassis, a connection member, a frame, a frame member, a middle member, a lateral member, or a lateral cover member, but the terms are not limited thereto.

The middle frame 800 according to an embodiment of the present disclosure may include a first supporting portion 810 and a second supporting portion 830. For example, the first supporting portion 810 may be a supporting portion, but the terms are not limited thereto. For example, the second supporting portion 830 may be a sidewall portion, but the terms are not limited thereto.

The first supporting portion 810 may be disposed between a rear edge (or a rear periphery) of the display panel 500 and a front edge (or a front periphery) of the supporting member 700, and thus, may provide a gap space GS between the display panel 500 and the supporting member 700. A front surface of the first supporting portion 810 may be coupled or connected to the rear edge of the display panel 500 by a first adhesive member 801. A rear surface of the first supporting portion 810 may be coupled or connected to the front edge of the supporting member 700 by a second adhesive member 803. For example, the first supporting portion 810 may have a single picture frame structure having a tetragonal shape or a picture frame structure having a plurality of division bar forms, but embodiments of the present disclosure are not limited thereto.

The second supporting portion 830 may be disposed in parallel with a thickness direction Z of the apparatus. For example, the second supporting portion 830 may be vertically coupled to an outer surface of the first supporting portion 810 in parallel with the thickness direction Z of the apparatus. The second supporting portion 830 may surround one or more of an outer surface of the display panel 500 and an outer surface of the supporting member 700, thereby protecting the outer surface of each of the display panel 500 and the supporting member 700. The first supporting portion 810 may protrude from an inner surface of the second supporting portion 830 to a gap space between the display panel 500 and the supporting member 700.

The apparatus according to an embodiment of the present disclosure may include a panel connection member (or a connection member) instead of the middle frame 800.

The panel connection member may be disposed between the rear edge of the display panel 500 and the front edge of the supporting member 700, and thus, may provide a gap space between the display panel 500 and the supporting member 700. The panel connection member may be disposed between the rear edge of the display panel 500 and the front edge of the supporting member 700 and may attach the display panel 500 on the supporting member 700. For example, the panel connection member may be implemented with a double-sided tape, a single-sided tape, a double-sided foam tape, a double-sided foam pad, or a double-sided adhesive foam pad, but embodiments of the present disclosure are not limited thereto. For example, an adhesive layer of the panel connection member may include epoxy, acryl, silicone, or urethane, but embodiments of the present disclosure are not limited thereto. For example, in order to reduce or minimize the transfer of a vibration of the display panel 500 to the supporting member 700, the adhesive layer of the panel connection member may include an acryl-based material, having a characteristic where an adhesive force is relatively good and hardness is high, among acryl and urethane. Accordingly, a vibration of the display panel 500 transferred to the supporting member 700 may be reduced or minimized.

According to another embodiment of the present disclosure, the middle frame 800 may be omitted. Instead of the middle frame 800, a panel connection member or an adhesive may be provided. According to another embodiment of the present disclosure, instead of the middle frame 800, a partition may be provided.

According to an embodiment of the present disclosure, at least one vibration member for outputting a sound of a full-range pitched sound band may be configured with one sound apparatus or one vibration apparatus, thereby providing an apparatus including a sound apparatus or a vibration apparatus which is thin in thickness and is miniaturized.

The sound apparatus or the vibration generating apparatus according to an embodiment of the present disclosure may be applied to a sound apparatus provided in the apparatus. The apparatus according to an embodiment of the present disclosure may be applied to mobile devices, video phones, smart watches, watch phones, wearable devices, foldable devices, rollable devices, bendable devices, flexible devices, curved devices, portable multimedia players (PMPs), personal digital assistants (PDAs), electronic organizers, desktop personal computers (PCs), laptop PCs, netbook computers, workstations, navigation devices, automotive navigation devices, automotive display apparatuses, televisions (TVs), wall paper display apparatuses, signage devices, game machines, notebook computers, monitors, cameras, camcorders, home appliances, etc. Also, the sound apparatus or the vibration generating apparatus according to the present disclosure may be applied to organic light emitting lighting devices or inorganic light emitting lighting devices. In a case where the sound apparatus or the vibration generating apparatus is applied to a lighting device, the sound apparatus or the vibration generating apparatus may act as lighting and a speaker. Also, in a case where sound apparatus or the vibration generating apparatus according to the present disclosure is applied to a mobile device, the sound apparatus or the vibration generating apparatus may be one or more of a speaker, a receiver, or a haptic, but embodiments of the present disclosure are not limited thereto.

A sound apparatus and an apparatus including the same according to an embodiment of the present disclosure will be described below.

A sound apparatus according to an embodiment of the present disclosure includes a first vibration member, a second vibration member adjacent to the first vibration member, a third vibration member adjacent to the second vibration member, a first vibration apparatus configured to vibrate the first vibration member and the second vibration member and output a sound of a first pitched sound band and a sound of a second pitched sound band which differ, and a second vibration apparatus disposed at a rear surface of the third vibration member and configured to vibrate the third vibration member and output a sound of a third pitched sound band which differs from the sound of the first pitched sound band.

According to some embodiments of the present disclosure, the first vibration apparatus may be configured to vibrate the first vibration member to generate the sound of the first pitched sound band, and vibrate the second vibration member to generate the sound of the second pitched sound band.

According to some embodiments of the present disclosure, the second vibration member may dispose to surround the first vibration member, and the third vibration member may be disposed to surround the first vibration member and the second vibration member.

According to some embodiments of the present disclosure, the second vibration member may be disposed apart from the first vibration member, and the third vibration member may be disposed apart from the second vibration member with a gap space interposed therebetween.

According to some embodiments of the present disclosure, the second vibration member may be at a periphery of the first vibration member.

According to some embodiments of the present disclosure, the third vibration member may be at a periphery of the second vibration member.

According to some embodiments of the present disclosure, the first vibration apparatus may include a vibration portion, a first electrode portion at a first surface of the vibration portion, and a second electrode portion at a surface different from the first surface of the vibration portion.

According to some embodiments of the present disclosure, the vibration portion may include one or more of a piezoelectric inorganic material and a piezoelectric organic material.

According to some embodiments of the present disclosure, the vibration portion may include a plurality of first portions and a plurality of second portions between the plurality of first portions, the plurality of second portions including an organic material, and each of the plurality of first portions may include one or more of a piezoelectric inorganic material and a piezoelectric organic material.

According to some embodiments of the present disclosure, may further include a first cover member at the first electrode portion, and a second cover member at the second electrode portion.

According to some embodiments of the present disclosure, may further include a first adhesive member between the first vibration apparatus and each of the first vibration member and the second vibration member, and a second adhesive member between the third vibration member and the first vibration apparatus.

According to some embodiments of the present disclosure, a modulus of the first adhesive member may differ from a modulus of the second adhesive member.

According to some embodiments of the present disclosure, a modulus of the first adhesive member may be greater than a modulus of the second adhesive member.

According to some embodiments of the present disclosure, a thickness of the first adhesive member may differ from a thickness of the second adhesive member.

According to some embodiments of the present disclosure, a thickness of the first adhesive member may be less than a thickness of the second adhesive member.

According to some embodiments of the present disclosure, the second vibration apparatus may include a frame, a bobbin on the frame, a magnet member provided inside or outside the bobbin, a coil wound around the bobbin, and a damper connected between the frame and the bobbin.

According to some embodiments of the present disclosure, the third vibration member may further include a concave portion and a protrusion portion, and the bobbin overlaps the protrusion portion.

According to some embodiments of the present disclosure, the first pitched sound band may include a high-pitched sound band, the second pitched sound band comprises a middle-pitched sound band, and the third pitched sound band comprises a low-pitched sound band.

According to some embodiments of the present disclosure, the second vibration member may extend to one portion of the first vibration apparatus.

According to some embodiments of the present disclosure, the second vibration member may protrude to an outer portion of the first vibration apparatus.

According to some embodiments of the present disclosure, the second vibration member may overlap the first vibration apparatus.

According to some embodiments of the present disclosure, the third vibration member may overlap the second vibration apparatus.

According to some embodiments of the present disclosure, the third vibration member may further include a concave portion and a protrusion portion, and the first vibration member and the second vibration member are disposed at the concave portion.

According to some embodiments of the present disclosure, the second vibration member may protrude to an outer portion of the first vibration apparatus, and the sound apparatus may further include a fourth vibration member disposed in a space between the second vibration member and the third vibration member.

According to some embodiments of the present disclosure, the fourth vibration member may be disposed to fill all of the space between the second vibration member and the third vibration member.

According to some embodiments of the present disclosure, the third vibration member may further include a concave portion and a protrusion portion, and the first vibration member, the second vibration member, and the fourth vibration member may be disposed in the concave portion.

According to some embodiments of the present disclosure, the fourth vibration member may output a sound of a low-pitched sound band.

According to some embodiments of the present disclosure, the fourth vibration member may include one or more of paper, synthetic resin, and metal.

According to some embodiments of the present disclosure, the first vibration member may include one or more of ceramic, metal, diamond, synthetic resin, and silk.

According to some embodiments of the present disclosure, the second vibration member and the third vibration member may include one or more of paper, synthetic resin, and metal.

An apparatus according to another embodiment of the present disclosure includes a passive vibration member, and a sound apparatus disposed at a rear surface of the passive vibration member. The passive vibration member may include a metal material, or comprises one or more single or complex nonmetal materials of wood, rubber, plastic, glass, fiber, cloth, paper, mirror, and leather.

An apparatus according to another embodiment of the present disclosure includes a passive vibration member, and a sound apparatus of disposed at a rear surface of the passive vibration member. The passive vibration member may include one or more of a display panel including a pixel configured to display an image, a light emitting diode lighting panel, an organic light emitting diode lighting panel, and an inorganic light emitting diode lighting panel.

An apparatus according to another embodiment of the present disclosure includes a passive vibration member, and a sound apparatus of disposed at a rear surface of the passive vibration member. The passive vibration member may include one or more of a display panel including a pixel configured to display an image, a screen panel on which an image is to be projected from a display apparatus, a lighting panel, a signage panel, a vehicular interior material, a vehicular glass window, a vehicular external material, a ceiling material of a building, an interior material of a building, a glass window of a building, an interior material of an aircraft, a glass window of an aircraft, metal, wood, rubber, plastic, glass, fiber, cloth, paper, leather, and mirror.

The apparatus according to embodiments of the present disclosure may include a vibration generating apparatus which vibrates a display panel or a passive vibration member, and thus, may generate a sound so that a sound travels toward a front surface of the display panel or the passive vibration member.

In the apparatus according to embodiments of the present disclosure, at least one vibration member for outputting a sound of a full range pitched sound band may be configured with one sound apparatus or one vibration apparatus, thereby providing an apparatus including a sound apparatus or a vibration apparatus which is thin in thickness and is miniaturized.

It will be apparent to those skilled in the art that various modifications and variations can be made in the sound apparatus and the apparatus including the same of the present disclosure without departing from technical idea or the scope of the disclosure. Thus, it is intended that the present disclosure cover the modifications and variations of this disclosure provided they come within the scope of the appended claims and their equivalents.

What is claimed is:

1. A sound apparatus, comprising:
- a first vibration member;
- a second vibration member adjacent to the first vibration member;
- a third vibration member adjacent to the second vibration member;
- a first vibration apparatus configured to vibrate the first vibration member and the second vibration member and output a sound of a first pitched sound band and a sound of a second pitched sound band which differ; and
- a second vibration apparatus disposed at a rear surface of the third vibration member and configured to vibrate the third vibration member and output a sound of a third pitched sound band which differs from the sound of the first pitched sound band.

2. The apparatus of claim 1, wherein the first vibration apparatus is configured to vibrate the first vibration member to generate the sound of the first pitched sound band, and vibrate the second vibration member to generate the sound of the second pitched sound band.

3. The apparatus of claim 1, wherein the second vibration member is disposed to surround the first vibration member, and
- wherein the third vibration member is disposed to surround the first vibration member and the second vibration member.

4. The apparatus of claim 1, wherein the second vibration member is disposed apart from the first vibration member, and
- wherein the third vibration member is disposed apart from the second vibration member with a gap space interposed therebetween.

5. The sound apparatus of claim 1, wherein the second vibration member is at a periphery of the first vibration member.

6. The sound apparatus of claim 1, wherein the third vibration member is at a periphery of the second vibration member.

7. The sound apparatus of claim 1, wherein the first vibration apparatus comprises:
- a vibration portion;
- a first electrode portion at a first surface of the vibration portion; and
- a second electrode portion at a surface different from the first surface of the vibration portion.

8. The sound apparatus of claim 7, wherein the vibration portion comprises one or more of a piezoelectric inorganic material and a piezoelectric organic material.

9. The sound apparatus of claim 7, wherein the vibration portion comprises a plurality of first portions and a plurality of second portions between the plurality of first portions, the plurality of second portions including an organic material, and
- each of the plurality of first portions comprises one or more of a piezoelectric inorganic material and a piezoelectric organic material.

10. The sound apparatus of claim 7, further comprising:
- a first cover member at the first electrode portion; and
- a second cover member at the second electrode portion.

11. The sound apparatus of claim 1, further comprising:
- a first adhesive member between the first vibration apparatus and each of the first vibration member and the second vibration member; and
- a second adhesive member between the third vibration member and the first vibration apparatus.

12. The sound apparatus of claim 11, wherein a modulus of the first adhesive member differs from a modulus of the second adhesive member.

13. The sound apparatus of claim 11, wherein a modulus of the first adhesive member is greater than a modulus of the second adhesive member.

14. The sound apparatus of claim 11, wherein a thickness of the first adhesive member differs from a thickness of the second adhesive member.

15. The sound apparatus of claim 11, wherein a thickness of the first adhesive member is less than a thickness of the second adhesive member.

16. The sound apparatus of claim 1, wherein the second vibration apparatus comprises:
- a frame;
- a bobbin on the frame;
- a magnet member provided inside or outside the bobbin;
- a coil wound around the bobbin; and
- a damper connected between the frame and the bobbin.

17. The sound apparatus of claim 16, wherein the third vibration member further comprises a concave portion and a protrusion portion, and
- the bobbin overlaps the protrusion portion.

18. The sound apparatus of claim 1, wherein the first pitched sound band comprises a high-pitched sound band, the second pitched sound band comprises a middle-pitched sound band, and the third pitched sound band comprises a low-pitched sound band.

19. The sound apparatus of claim 1, wherein the second vibration member extends to one portion of the first vibration apparatus.

20. The apparatus of claim 1, wherein the second vibration member protrudes to an outer portion of the first vibration apparatus.

21. The sound apparatus of claim 1, wherein the second vibration member overlaps the first vibration apparatus.

22. The sound apparatus of claim 1, wherein the third vibration member overlaps the second vibration apparatus.

23. The sound apparatus of claim 1, wherein the third vibration member further comprises a concave portion and a protrusion portion, and the first vibration member and the second vibration member are disposed at the concave portion.

24. The sound apparatus of claim 1, wherein the second vibration member protrudes to an outer portion of the first vibration apparatus, and the sound apparatus further comprises a fourth vibration member disposed in a space between the second vibration member and the third vibration member.

25. The sound apparatus of claim 24, wherein the fourth vibration member is disposed to fill all of the space between the second vibration member and the third vibration member.

26. The sound apparatus of claim 24, wherein the third vibration member further comprises a concave portion and a protrusion portion, and the first vibration member, the second vibration member, and the fourth vibration member are disposed in the concave portion.

27. The sound apparatus of claim 24, wherein the fourth vibration member outputs a sound of a low-pitched sound band.

28. The sound apparatus of claim 24, wherein the fourth vibration member comprises one or more of paper, synthetic resin, and metal.

29. The sound apparatus of claim 1, wherein the first vibration member comprises one or more of ceramic, metal, diamond, synthetic resin, and silk.

30. The sound apparatus of claim 1, wherein the second vibration member and the third vibration member comprise one or more of paper, synthetic resin, and metal.

31. An apparatus, comprising:

a passive vibration member; and a sound apparatus of claim 1 disposed at a rear surface of the passive vibration member.

32. The apparatus of claim 31, wherein the passive vibration member comprises a metal material, or comprises one or more single or complex nonmetal materials of wood, rubber, plastic, glass, fiber, cloth, paper, mirror, and leather.

33. The apparatus of claim 31, wherein the passive vibration member comprises one or more of a display panel including a pixel configured to display an image, a light emitting diode lighting panel, an organic light emitting diode lighting panel, and an inorganic light emitting diode lighting panel.

34. The apparatus of claim 31, wherein the passive vibration member comprises one or more of a display panel including a pixel configured to display an image, a screen panel on which an image is to be projected from a display apparatus, a lighting panel, a signage panel, a vehicular interior material, a vehicular glass window, a vehicular external material, a ceiling material of a building, an interior material of a building, a glass window of a building, an interior material of an aircraft, a glass window of an aircraft, metal, wood, rubber, plastic, glass, fiber, cloth, paper, leather, and mirror.

35. The apparatus of claim 31, further comprising: a connection member configured to connect the sound apparatus to the rear surface of the passive vibration member and including a hollow portion provided between the sound apparatus and the passive vibration member.

* * * * *